(12) United States Patent
Centonza et al.

(10) Patent No.: US 10,057,904 B2
(45) Date of Patent: Aug. 21, 2018

(54) METHOD AND DEVICE FOR RESUMPTION OF RRC STATE IN CELLULAR NETWORK

(71) Applicant: Telefonaktiebolaget LM Ericsson (publ), Stockholm (SE)

(72) Inventors: Angelo Centonza, Stockholm (SE); Lars-Bertil Olsson, Angered (SE); Paul Schliwa-Bertling, Ljungsbro (SE); Alexander Vesely, Feldbach (AT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/554,840

(22) PCT Filed: Jan. 9, 2017

(86) PCT No.: PCT/EP2017/050321
§ 371 (c)(1),
(2) Date: Aug. 31, 2017

(87) PCT Pub. No.: WO2017/118758
PCT Pub. Date: Jul. 13, 2017

(65) Prior Publication Data
US 2018/0035420 A1 Feb. 1, 2018

Related U.S. Application Data

(60) Provisional application No. 62/276,414, filed on Jan. 8, 2016.

(51) Int. Cl.
*H04W 72/04* (2009.01)
*H04W 76/04* (2009.01)
(Continued)

(52) U.S. Cl.
CPC ....... *H04W 72/048* (2013.01); *H04W 76/046* (2013.01); *H04W 76/27* (2018.02); *H04W 72/085* (2013.01)

(58) Field of Classification Search
None
See application file for complete search history.

(56) References Cited

U.S. PATENT DOCUMENTS

2007/0064710 A1* 3/2007 Holmstrom ........... H04W 28/26
370/395.2
2009/0190568 A1* 7/2009 Son .................... H04W 72/048
370/346
(Continued)

FOREIGN PATENT DOCUMENTS

CN 103348733 A 10/2013

OTHER PUBLICATIONS

3rd Generation Partnership Project, "3rd Generation Partnership Project; Technical Specification Group Services and System Aspects; Architecture enhancements for Cellular Internet of Things (Release 13)," 3GPP TR 23.720 v1.2.0, Technical Specification, Nov. 1, 2015, Sophia Antipolis, France., pp. 1-96.
(Continued)

*Primary Examiner* — Xavier Szewai Wong
(74) *Attorney, Agent, or Firm* — Coats & Bennett, PLLC

(57) ABSTRACT

A radio resource control suspend operation and a radio resource control resume operation. The terminal (702, 1300) and the communication network (110) stores respective radio resource control information related to a configured connected state of the terminal (702, 1300). The method comprises performing an admission control process during the radio resource control resume operation, where the admission control process comprises a procedure for examining whether the connected state is to be resumed according to the stored radio resource configuration information or if a radio resource reconfiguration procedure is to be performed for resuming the connected state.

34 Claims, 18 Drawing Sheets

(51) Int. Cl.
*H04W 76/27* (2018.01)
*H04W 72/08* (2009.01)

(56) References Cited

U.S. PATENT DOCUMENTS

2010/0255847 A1* 10/2010 Lee .................. H04W 52/50
                                              455/436
2014/0321272 A1* 10/2014 Bangolae .......... H04W 36/0066
                                              370/230
2017/0347346 A1* 11/2017 Anderson ............ H04W 76/38

OTHER PUBLICATIONS

HTC, "RRC aspects in NB-IoT," 3GPP TSG-RAN2 Meeting #92, R2-156425, Agenda Item: 7.16.2.1, Anaheim, CA, Nov. 16, 2015, pp. 1-19.

Ericsson, "Signaling reduction for Ue state transitions," SA WG2 Meeting #110, Agenda Item: 6.12, S2-152554, Jun. 6, 2015, Dubrovnik, Croatia, pp. 1-7.

* cited by examiner

| IE/Group Name | Presence | Range | IE type and reference | Semantics description | Criticality | Assigned Criticality |
|---|---|---|---|---|---|---|
| E-RAB to be Modified List | | 0..1 | | | YES | reject |
| >E-RAB to Be Modified Item IEs | | 1..<maxnoofE-RABs> | | | EACH | reject |
| >>E-RAB ID | M 1405 | | 9.2.1.2 | | - | |
| >>Transport Layer Address | M | | 9.2.2.1 | | - | |
| >>DL GTP TEID | M | | GTP-TEID 9.2.2.2 | | - | |
| >>Removal Indication | M 1406 | ENUMERATED (Remove,....) | | | - | |
| >>E-RAB Level QoS Parameters | O | | | | | |
| E-RAB not to be Modified List | | 0..1 | | | YES | reject |
| >E-RAB not to Be Modified Item IEs | | 1..<maxnoofE-RABs> | | | EACH | reject |
| >>E-RAB ID | M | | 9.2.1.2 | | - | |
| >>Transport Layer Address | M | | 9.2.2.1 | | - | |
| >>DL GTP TEID | M | | GTP-TEID 9.2.2.2 | | - | |

| IE/Group Name | Presence | Range | IE type and reference | Semantics description | Criticality | Assigned Criticality |
|---|---|---|---|---|---|---|
| E-RAB to be Modified List | | 0..1 | | | YES | reject |
| >E-RAB to Be Modified Item IEs | | 1 .. <maxnoofE-RABs> | | | EACH | reject |
| >>E-RAB ID | M | | | | - | |
| >>Transport Layer Address | O | | | | - | |
| >>DL GTP TEID | O | | | | - | |
| >>E-RAB Level QoS Parameters | O | | | | | |
| E-RAB Setup List | | 0..1 | | | YES | ignore |
| >E-RAB Setup Item IEs | | 0 .. <maxnoofE-RABs> | | | EACH | ignore |
| >>E-RAB ID | M | | | | - | |
| >>Transport Layer Address | O | | | | - | |
| >>GTP-TEID | O | | | | - | |
| E-RAB Failed to Setup List | | 0..1 | | | | |
| >E-RAB List Item | | 0 .. <maxnoofE-RABs> | | | EACH | ignore |
| >>E-RAB ID | M | | | | - | - |
| >>Cause | M | | | | - | - |

US 10,057,904 B2

METHOD AND DEVICE FOR RESUMPTION OF RRC STATE IN CELLULAR NETWORK

FIELD OF THE INVENTION

The present invention relates to a method of radio resource control in a communication network entity and to a corresponding communication network entity designed for supporting a communication between a terminal and a communication network that comprises the communication network entity, where the communication between the communication network and the terminal is carried over one or more radio resources.

BACKGROUND

An example of a basic architecture for wireless communication is shown in FIG. 1. One or more terminals 101, e.g. user terminals such as User Equipments (UEs) communicate with a communication network 110 using radio resources 120, e.g. bearers such as E-RABs (E-UTRAN Radio Access Bearers). The communication network 110 may comprise an access network 102, e.g. comprising a base station such as an eNodeB, and a communication control network 103, e.g. a core network such as an Evolved Packet Core.

In the context of 3GPP standardization, it has been recognized that the establishment and tearing down of connections between a terminal and a communication network can lead to significant signaling overhead. In order to reduce signaling overhead it has been proposed to re-use information from a previous connection that was stored, instead performing a complete connection setup every time that a transition between an idle state and an active (i.e. connected) state of the terminal takes place. More specifically, 3GPP TR 23.720 V. 1.2.0 suggests two procedures in sections 6.5.1.2 and 6.5.1.3 called RRC suspend and RRC resume.

SUMMARY

The object of the invention is to provide an improvement for systems of the above described type.

The invention concerns a system in which a terminal and a communication network are arranged to support a radio resource control suspend operation and a radio resource control resume operation. In the radio resource control suspend operation each of the terminal and the communication network stores respective radio resource control information related to a configured connected state of the terminal. The radio resource control information comprises radio resource configuration information belonging to a set of radio resources (e.g. bearers) associated with the configured connected state. In the radio resource control resume operation the terminal and the communication network each refers to the respectively stored radio resource control information for resuming an connected state of said terminal.

According to one embodiment a method of radio resource control in a communication network entity designed for supporting a communication between a terminal and a communication network that comprises the communication network entity is proposed. Communication between the communication network and the terminal is carried over one or more radio resources. The method comprises performing an admission control process during the radio resource control resume operation, where the admission control process comprises a procedure for examining whether the connected state is to be resumed according to the stored radio resource configuration information or if a radio resource reconfiguration procedure is to be performed for resuming the connected state.

According to another embodiment, a communication network entity designed for supporting a communication between a terminal and a communication network that comprises the communication network entity is proposed. The communication between the communication network and the terminal is carried over one or more radio resources. The communication network entity comprises a radio resource controller arranged for performing an admission control process during the radio resource control resume operation. The admission control process comprises a procedure for examining whether the connected state is to be resumed according to the stored radio resource configuration information or if a radio resource reconfiguration procedure is to be performed for resuming the connected state.

According to another embodiment a method of radio resource control in terminal designed for supporting a communication between the terminal and a communication network is proposed. The communication between the communication network and the terminal is carried over one or more radio resources. The method comprises performing a radio resource control resume process that comprises determining whether the connected state is to be resumed according to the stored radio resource configuration information or if different radio resource configuration information is to be used for resuming the connected state.

According to another embodiment a terminal designed for supporting a communication between the terminal and a communication network is proposed. The communication between the communication network and the terminal being carried over one or more radio resources. The terminal comprises a radio resource controller arranged for performing a radio resource control resume process that comprises determining whether the connected state is to be resumed according to the stored radio resource configuration information or if different radio resource configuration information is to be used for resuming the connected state.

In accordance with the above embodiments a communication system supporting a radio resource control suspend and a radio resource control resume operation is improved in that if it is necessary or desirable to resume the connected state of the terminal with a different configuration of radio resources than the set of radio resources as configured when suspending communication, then this becomes possible by virtue of the proposed admission control process in the communication network entity and the proposed radio resource control resume process in the terminal.

BRIEF DESCRIPTION OF THE DRAWINGS

FIG. 16 shows an example of information that may be included in an S1: UE Context Active/Ack message;

FIG. 17 shows another example of information that may be included in an S1: UE Context Active/Ack message;

DETAILED DESCRIPTION

In the following the concepts of the present invention will be described with reference to specific examples and implementations, which are, however, not intended to be limiting but only serve to better illustrate the inventive concepts.

For example, some of the implementations set out in the following will make reference to the EPS/LTE architecture (EPS=Evolved Packet System; LTE=Long Term Evolution) and EPS/LTE radio access technology and thus the related protocols on the relevant interfaces. However, this is only by way of example and the invention can be made applicable to other wireless communication technologies where certain connection related information is stored (or cached) in a suspend operation and re-used (modified at re-use) for subsequent connection or transaction (data exchange) between the network and the terminal (e.g. a wireless device) in a resume operation.

Figure 2:
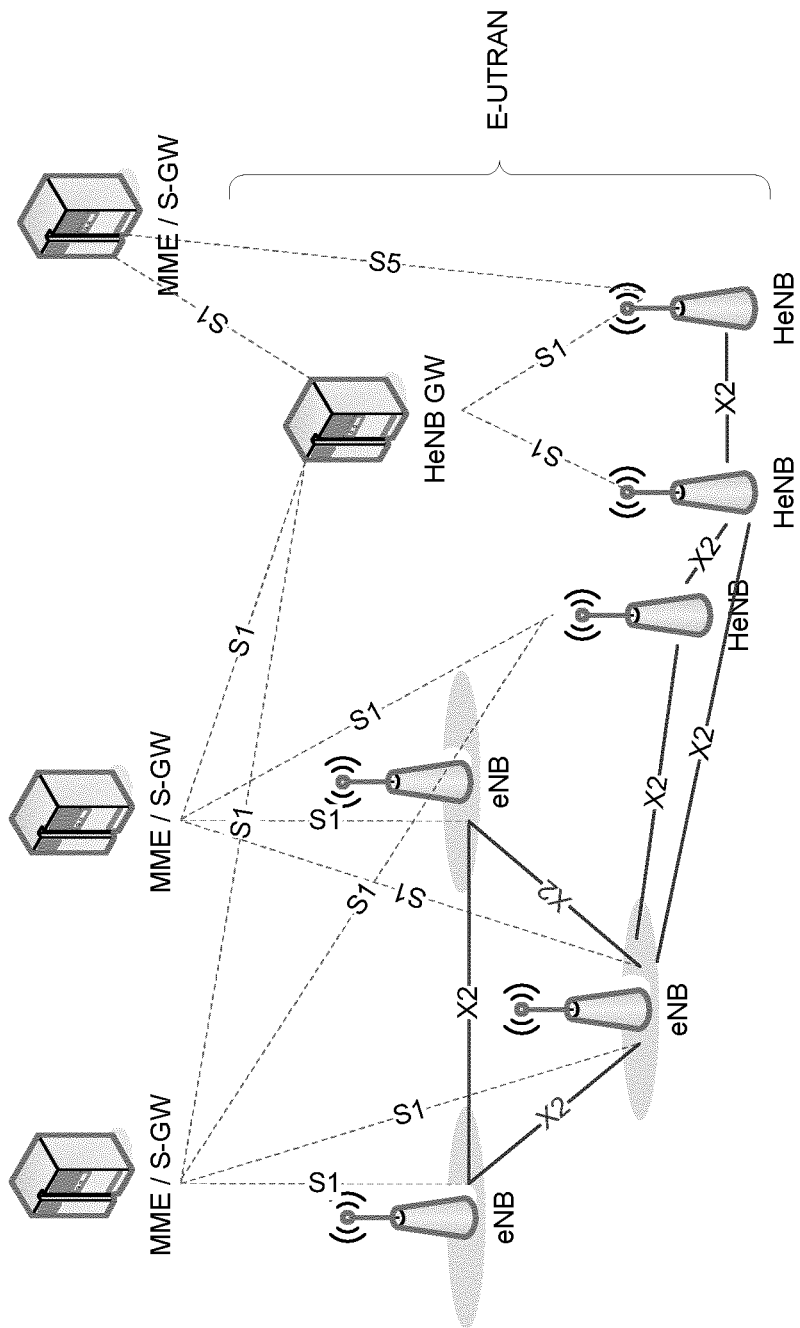
FIG. 2 shows an example of a communication network.

As an example of a communication network, the architecture of the LTE system is shown in FIG. 2, including radio access nodes (eNBs, Home eNBs—HeNBs, HeNB GW; GW=Gateway), which can be seen as belonging to an access network, and evolved packet core nodes (MME/S-GW; MME=Mobility Management Entity; S-GW=Serving Gateway), which can be seen as belonging to a core network, which is an example of a communication control network. As it can be seen, an S1 interface connects HeNBs/eNBs to the MME/S-GW and HeNBs to the HeNB GW, while an X2 interface connects peer eNBs/HeNBs.

In the present application, the terms "node" and "entity" will be used interchangeably as relating to a network element that is designed for providing a given functionality in the network, and which can be embodied as a single physical unit or a plurality of connected and interacting physical units. Furthermore, a node or entity can be embodied in the form of hardware, software or any suitable combination of hardware and software.

Figure 3:
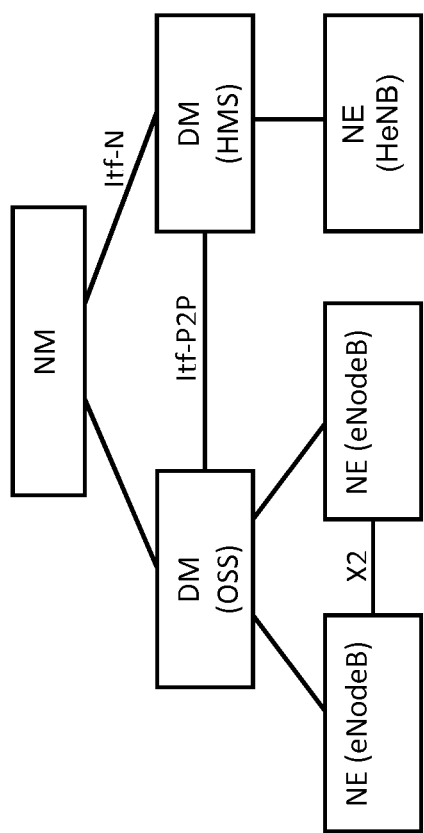
FIG. 3 shows an example of a management system.

An example of a management system is shown in FIG. 3. The node elements (NE), also referred to as eNodeB, are managed by a domain manager (DM), also referred to as the operation and support system (OSS). A DM may further be managed by a network manager (NM). Two NEs are interfaced by X2, whereas the interface between two DMs is referred to as Itf-P2P. The management system may configure the network elements, as well as receive observations associated to features in the network elements. For example, DM observes and configures NEs, while NM observes and configures DM, as well as NE via DM. By means of configuration via the DM, NM and related interfaces, functions over the X2 and S1 interfaces can be carried out in a coordinated way throughout the RAN (Radio Access Network), possibly involving the Core Network (CN), e.g. MME and S-GWs.

To meet the demands for more traffic capacity and the flexibility to accommodate different types of traffic a main focus in the development of wireless communication systems such as LTE so far is/was on the radio interface where a lot of effort has been spent on improving the radio capacity through e.g. increase of spectral efficiency by physical layer improvements. Another aspect of traffic growth is the increasing number of associated connection establishments between the terminals (wireless communication devices, that can be embodied in many ways, for example as one or more of a UE, mobile phone, smartphone, data modem, mobile computer, vehicle, sensor, actuator, etc.) and the network by means of control plane signaling. The latter needs to be understood as on one hand a demand for radio resources to conduct the signaling over the appropriate (e.g. Uu) interface while on the other hand a requirement on processing capacity and signaling in the deployed infrastructure. The need to put special attention on that area is confirmed by a number of studies conducted or still ongoing in 3GPP like EDDA (Enhancements for Diverse Data Applications) or MTC (Machine-Type Communications) related study and work items.

The concept of UE context suspension addresses the desire to reduce signaling between the UE and the network, similarly between the RAN and CN nodes. Furthermore it enables network nodes to spend more capacity for the traffic growth through spending less processing effort on signaling, especially in case of UEs frequently (re-)establishing connections with the network. A result of signaling and processing reduction is reduced delay experienced at transition from RRC-Idle to RRC-Connected. Among other factors, UEs' battery lifetime is also reduced by the amount of control plane signaling sustained. Hence signaling overhead reduction will inevitably result in an improved UE battery consumption. Significant contributors to the signaling overhead are procedures used in current S1-based EPS architecture required for UE state transition, i.e. at transition between the Idle and the Connected (i.e. Active) state.

Figure 4:
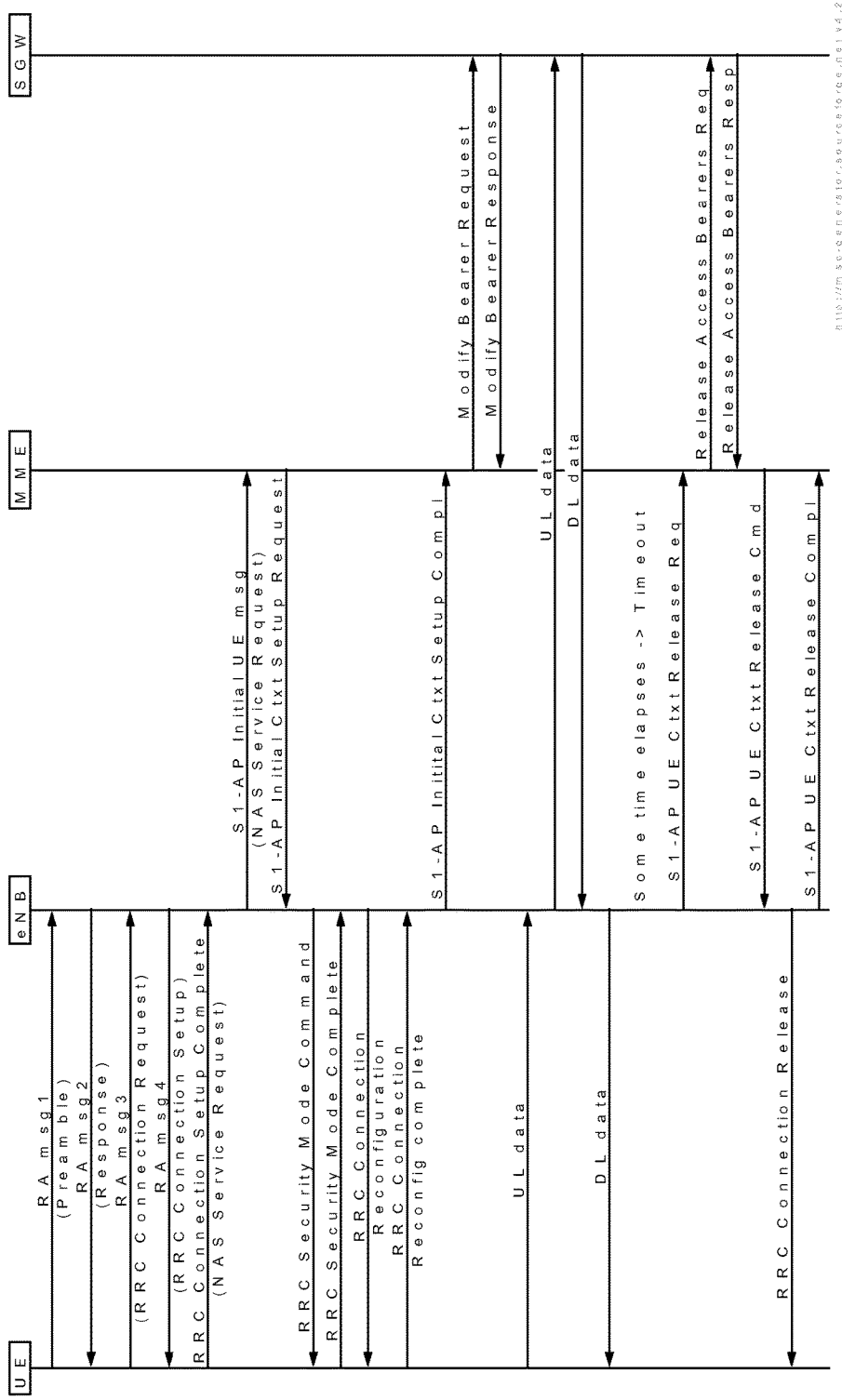
FIG. 4 illustrates S1/EPS architecture based procedures as described in section 6.5 of 3GPP TR 23.720 V.1.2.0.

FIG. 4 illustrates S1/EPS architecture based procedures as described in section 6.5 of 3GPP TR 23.720 V.1.2.0 to establish and tear down a connection in order for the UE to be able to transfer/receive the user plane, i.e. procedures applicable at UE Idle/Connected state transition. As can be seen there is a significant signaling overhead on the radio/Uu, S1AP interface. In order to reduce the signaling overhead and the associated processing load in the communication network required by the procedures illustrated above, a solution is proposed that is based on the re-use of information from the previous RRC connection for the subsequent RRC connection setup. A signaling overhead reduction can be realized by introducing two new procedures 'RRC Suspend' and 'RRC Resume' that are e.g. described in clauses 6.5.1.2 and 6.5.1.3 of TR 23.720 v1.2.0.

Figure 5:
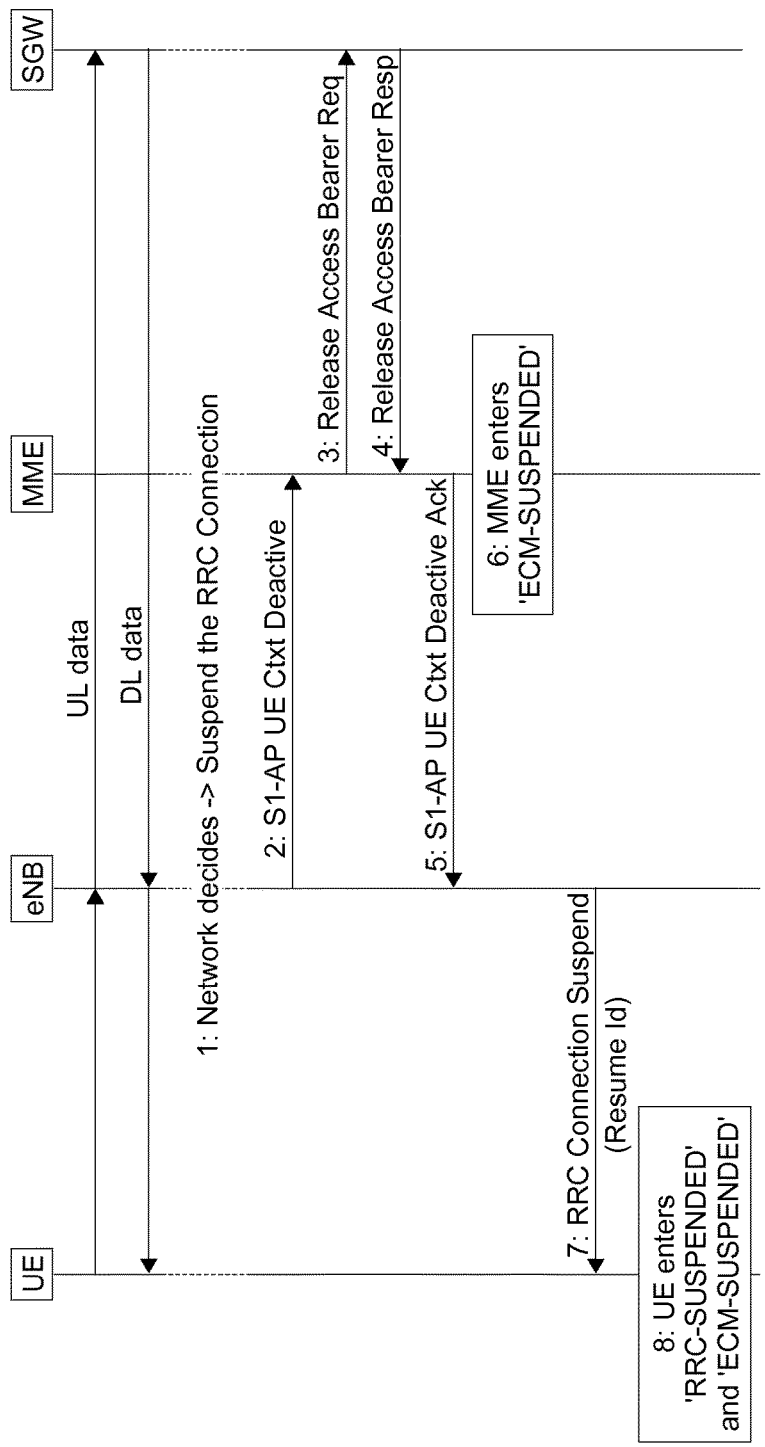
FIG. 5 illustrates a radio resource control suspend operation.

Accordingly, one non-limiting example of a radio resource control suspend operation is illustrated in FIG. 5. The RRC Suspend procedure may be used at transition from RRC-Connected (or active state) to a new RRC state that corresponds to a suspended state. In the context of this disclosure the terms "suspending", "suspend" or "suspension" in relation to e.g. an RRC connection means storing a context relating to the RRC connection (or storing RRC connection data) and one or more of:

inhibiting the transmission of user plane data between a mobile device and a RAN node, but the mobile device still being able to receive paging from the RAN node and/or to receive notifications of downlink data from the RAN node;

a RAN node instructing a mobile device to perform functions (for example, paging and mobility procedures that may differ from those used in a normal or non-suspended RRC connected mode) that are the same as or similar to idle mode functions; and releasing the air interface or radio link(s) or radio resources associated with the RRC connection between the RAN node and the mobile device but the mobile device still being able to receive paging from the RAN node and/or to receive notifications of downlink data from the RAN node.

This state may be called RRC-SUSPENDED (which is akin to idle state and could therefore also be called RRC-IDLE):

the eNodeB and the UE store previous RRC connection related information, e.g. Access Stratum Security Context, bearer related information (incl. RoHC state information) and L2/1 parameters when applicable. The eNB provides the UE with an identifier, referred as 'Resume ID' e.g. based on the eNB ID, which can be used to address the relevant information stored in the eNB.

Relevant network nodes store S1-MME UE association and S1-U bearer context related information. S1AP UE Contexts may be stored and kept in the eNB and the MME. Additionally, the eNB may store and keeps the S1-U tunnel addresses. The latter reduces the processing load on the eNB required for establishment of S1-U bearers.

While in RRC-SUSPENDED state the UE's mobility behavior is the same as in RRC-Idle state, e.g. the UE applies normal or extended Idle mode DRX parameters, performs cell re-selection etc.

At transition to RRC-SUSPENDED, the EMM (EPS Mobility Management; EPS=Evolved Packet System) layer enters ECM-SUSPENDED (ECM=EPS Connection Management) state.

Referring to FIG. 5, eight steps are shown:

Step 1: Network decides to suspend the RRC Connection.

Step 2: eNB indicates to MME with a new S1AP message that the UE's RRC connection is suspended. MME and eNB store the S1AP association and the related UE Contexts. MME enters ECM state ECM-SUSPENDED. MME stores the DL TEIDs associated with the UE and eNodeB.

Step 3: The MME sends a Release Access Bearers Request (Abnormal Release of Radio Link Indication) message to the S-GW that requests the release of all S1-U bearers for the UE. SGW considers UE being in Idle state.

Step 4: SGW provides a response to step 3.

Step 5: MME Acks step 2.

Step 6: MME enters 'ECM-SUSPENDED' state.

Step 7: eNB suspends the RRC Connection towards the UE. An identifier that is used at subsequent resumption of that suspended RRC Connection can be provided. The UE and the eNB store the related Context information, i.e. RRC configuration, bearer configuration (including RoHC state information), Access Stratum Security Context and L2/1 parameters when applicable. This message also contains the security algorithm configuration and the Next Hop Chaining Counter (NCC) associated with the K eNB that is to be used at subsequent resumption.

Step 8: UE RRC layer enters the suspended state e.g called RRC-SUSPENDED state, and the UE EMM layer enters also the suspended state, e.g. called ECM-SUSPENDED state.

Figure 6:
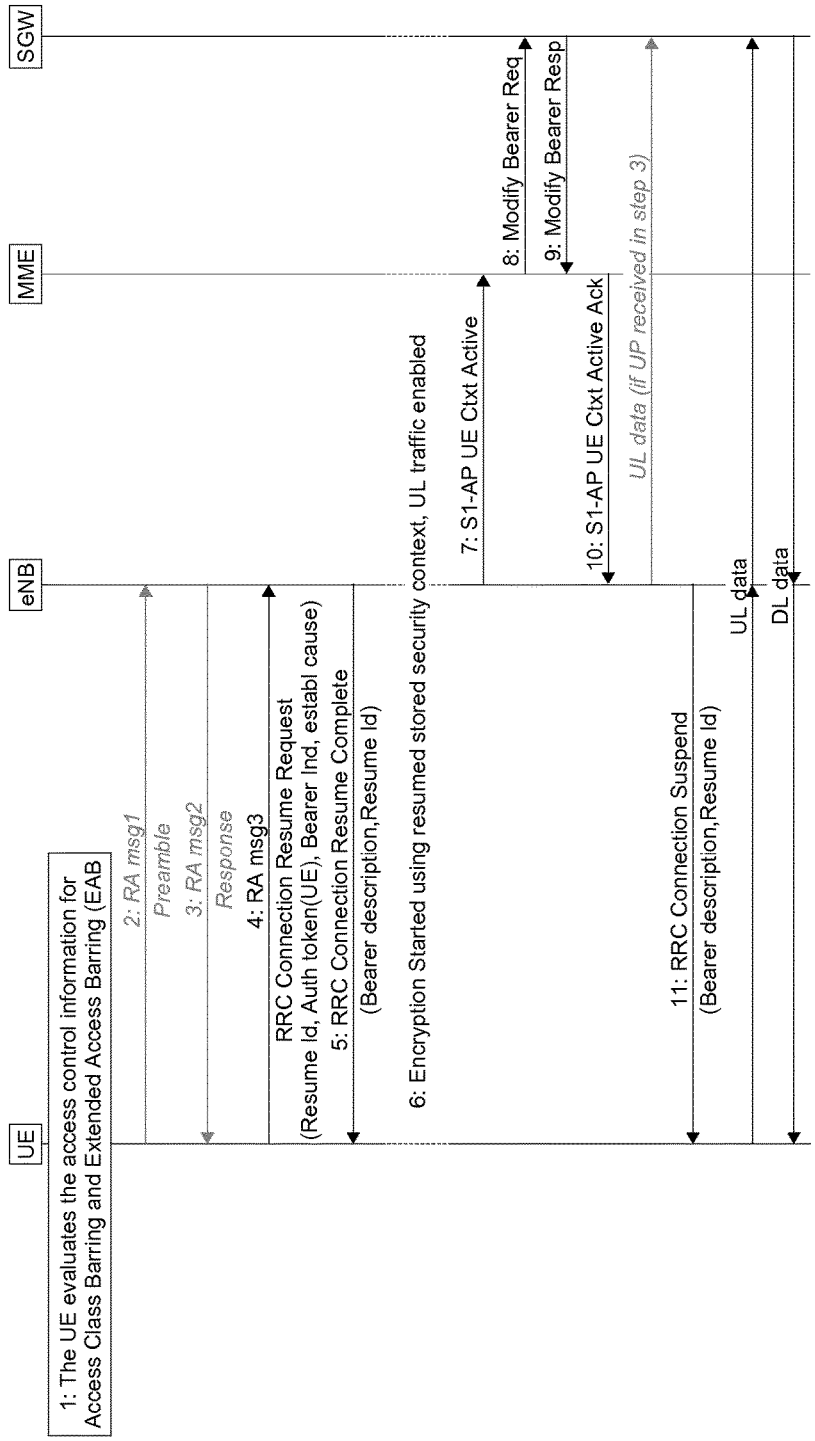
FIG. 6 illustrates a radio resource control resume operation.

A non-limiting example of a radio resource control resume operation is illustrated in FIG. 6. At the transition from the suspended to the connected state, previously stored information in the UE as well as in the eNodeB may be utilized to resume the RRC connection. During the connected mode or state, the UE may exchange signals with the network and perform other related operations, including the ability to perform user-plane communications with the network, while during the idle (suspended) mode or state, the UE may shut down at least some of its abilities and operations, and is no-longer able to perform user-plane communications with the network. The UE provides the previously received 'Resume ID' to be used by the eNB to access the stored information required to resume the RRC Connection. Furthermore it may provide an Authentication Token used to securely identify the UE. Relevant network nodes re-store/re-use S1-MME UE SLAP association and S1-U bearer context related information. Eleven steps are illustrated in FIG. 6:

Steps 1-3 follow the legacy procedure when UE accesses the network from RRC Idle state via Random Access (RA).

Step 4: In msg3, a RRC Connection Resume Request message, the UE may include one or more of its Resume Id, Authentication Token, Bearer Ind, Establishment Cause. eNB uses the Resume Id to associate the UE with the previously stored UE Context. Additionally, msg3 can also contain User Plane multiplexed by MAC where resumed stored security context may be used to encrypt the User Plane.

Step 5: In message 4, designated here as RRC Connection Resume Complete, the network indicates which DRBs (Data Radio Bearers) are resumed, furthermore it includes the Resume Id and if applicable updated L2/1 parameters.

Step 6: UE and eNB resume the stored security context.

Step 7: eNB notifies the MME about UE state change in a SLAP message designated here as S1-AP UE Context Active. ECM in the MME enters the ECM-CONNECTED state. MME identifies that the UE returns at the eNodeB for which MME has stored information about allocated DL TEIDs (Down Link Tunnel Endpoint IDs) for the UE.

Step 8: The MME sends a Modify Bearer Request message (eNodeB address, S1 TEID(s) (DL) for the accepted EPS bearers, Delay Downlink Packet Notification Request, RAT Type) per PDN connection to the Serving GW (RAT=Radio Access Technology). If the Serving GW supports Modify Access Bearers Request procedure and if there is no need for the Serving GW to send the signaling to the PGW, the MME may send Modify Access Bearers Request (eNodeB address(es) and TEIDs for downlink user plane for the accepted EPS bearers, Delay Downlink Packet Notification Request) per UE to the Serving GW to optimize the signaling. The Serving GW is now able to transmit downlink data towards the UE. The SGW considers the UE as being in Connected state.

Step 9: SGW provides as response to step 8.

Step 10: MME acks step 7. After this step User Plane can be sent towards the SGW.

Step 11: Alternatively to transmission of message 4, if message 3 included User Plane and indication that all User Plane is transmitted, the eNB can suspend the RRC connection and implicitly indicate that the User Plane was successfully received.

A solution has thus been proposed to enable a terminal such as the UE to move to RRC_IDLE while the UE context (comprising the Access Stratum (AS) context, e.g. Access Stratum Security Context, bearer related information and L2/1 parameters when applicable) as well as respective S1 and bearer context(s) may be kept respectively at the RAN node and at the MME that served the UE when it was in RRC (Radio Resource Control) active (RRC_CONNECTED). While the UE is in idle, the serving RAN and CN can store, as part of the UE context kept, the bearer context(s), comprising network resource configuration information applicable for the UE while in active mode. The S1-MME signaling connection established for the UE that suspended its RRC connection would be kept while the MME may assume the UE to be in in an idle state, ECM_IDLE. When the UE moves back from Idle to active, the mechanisms described in TR 23.720 V.1.2.0 allow the UE to indicate a so called "Resume ID", namely an identifier assigned to the UE at previous Active to Idle transition or at any time previous time, e.g. at connection setup. By signaling the Resume ID and 'Bearer Ind' at Idle to Active transition the UE is able to flag to the serving RAN that its context is still kept and that it should be reactivated together with all the bearers associated with it.

Reasons for reactivation of the UE context and corresponding bearers (user plane and/or signal plane bearers) can be numerous: the UE might have bearer traffic to transmit, the network could have bearer traffic to send to the UE,). In the systems described above the radio resources used by EPS bearers of the UE before going to Idle are re-established by the serving eNB and MME when the UE moves back to active. However, it might happen that at the time the UE moves from Idle to Active some of the radio resources previously assigned to the UE cannot be re-established or it is desirable that they be modified. The latter could e.g. be due to resource restrictions in the network or due to error cases associated to some of the bearers in question.

In the system of TR 23.720 v1.2.0 it is not possible to modify a UE's bearer context configuration when a UE for which the context was suspended moves from Idle to Active. At Idle to Active transition the RAN and CN must reactivate and admit the whole set of bearers that was stored as part of the UE context when the UE moved from Active to Idle. However, it may not be possible for the network to admit the whole set of bearers due to for example lack of resources in the RAN or in the CN. Therefore, a problem of the system of TR 23.720 v1.2.0 is that it does not allow for a modification of the bearer context stored for a UE that moved to Idle at the time the UE moves to Active. According to TR 23.720 v1.2.0 the full bearer list should be admitted. However, this may cause service disruptions because admitting bearers when sufficient resources are not available means to risk deterioration of QoS for the admitted bearers and for those bearers that have equal priority to them.

The concept of the present invention is proposed in the context of radio resource control in a communication between a terminal and a communication network, where the communication between the communication network and the terminal is carried over one or more radio resources. Bearers, such as E-RABs (E-UTRAN Radio Access Bearers) are examples of radio resources. The terminal and communication network can be provided in any suitable or desirable way. For example, a terminal may be any device capable of radio resource based communication with an appropriately arranged communication network. Examples for terminals are user terminals or terminals associated with specific machines (such as a mobile phone, smartphone, data modem, mobile computer, vehicle, sensor, actuator, etc.) and can e.g. be embodied as User Equipments (UEs). Examples of a communication network may comprise an access network (e.g. a RAN) and a communication control network (e.g. a CN).

The invention envisions systems in which a terminal and a communication network are arranged to support a radio resource control suspend operation and a radio resource control resume operation. In the radio resource control suspend operation each of the terminal and the communication network stores respective radio resource control information related to a configured connected state of the terminal. The radio resource control information comprises radio resource configuration information belonging to a set of radio resources (e.g. bearers) associated with the configured connected state. In the radio resource control resume operation the terminal and the communication network each refers to the respectively stored radio resource control information for resuming a connected state of the terminal.

According to an embodiment, the invention proposes performing an admission control process during the radio resource control resume operation, where the admission control process comprises a procedure for examining whether the connected state is to be resumed according to the stored radio resource configuration information or if a radio resource reconfiguration procedure is to be performed for resuming the connected state. In a system in which the terminal is a UE and the radio resources are bearers, it may e.g. be envisioned that if, at the time the UE moves to Active, there be an admission control process in one or more entities of the communication network that decides whether all the bearers can be reactivated according to their previously stored bearer settings (e.g. QoS parameters per bearer) or whether some of the bearers need to be removed or modified. Further, it could be envisioned that a bearer be added, for example because the UE needs to establish one extra service, at the time of Idle to Active transition.

Therefore, the present invention provides a solution allowing for a dynamic radio resource modification and/or radio resource addition and/or radio resource removal once the terminal resumes a previously suspended connection and where the radio resource configuration the communication network wants to assign to the terminal's radio resources at resume is different from the radio resource status at the time the terminal's connection was suspended.

According to another embodiment, the invention proposes performing a radio resource control resume process on the terminal side that comprises determining whether said connected state is to be resumed according to the stored radio resource configuration information or if different radio resource configuration information is to be used for resuming the connected state.

Figure 1:
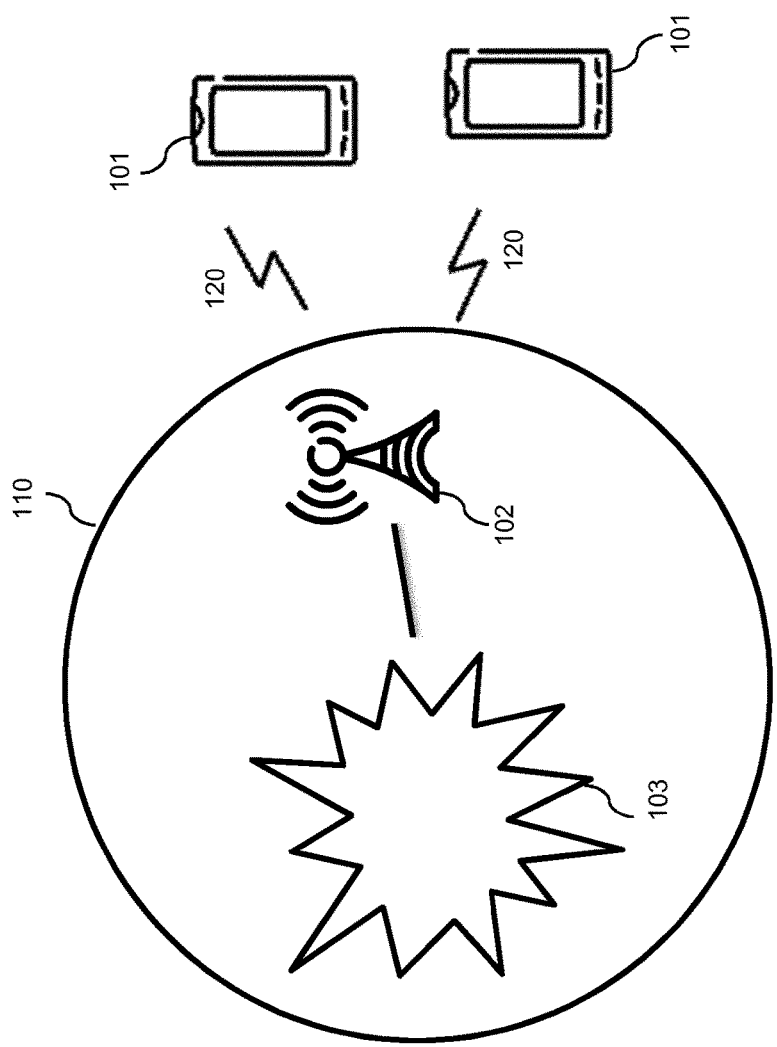
FIG. 1 shows a schematic representation of a basic system architecture for wireless communication using radio resources.
Figure 7:
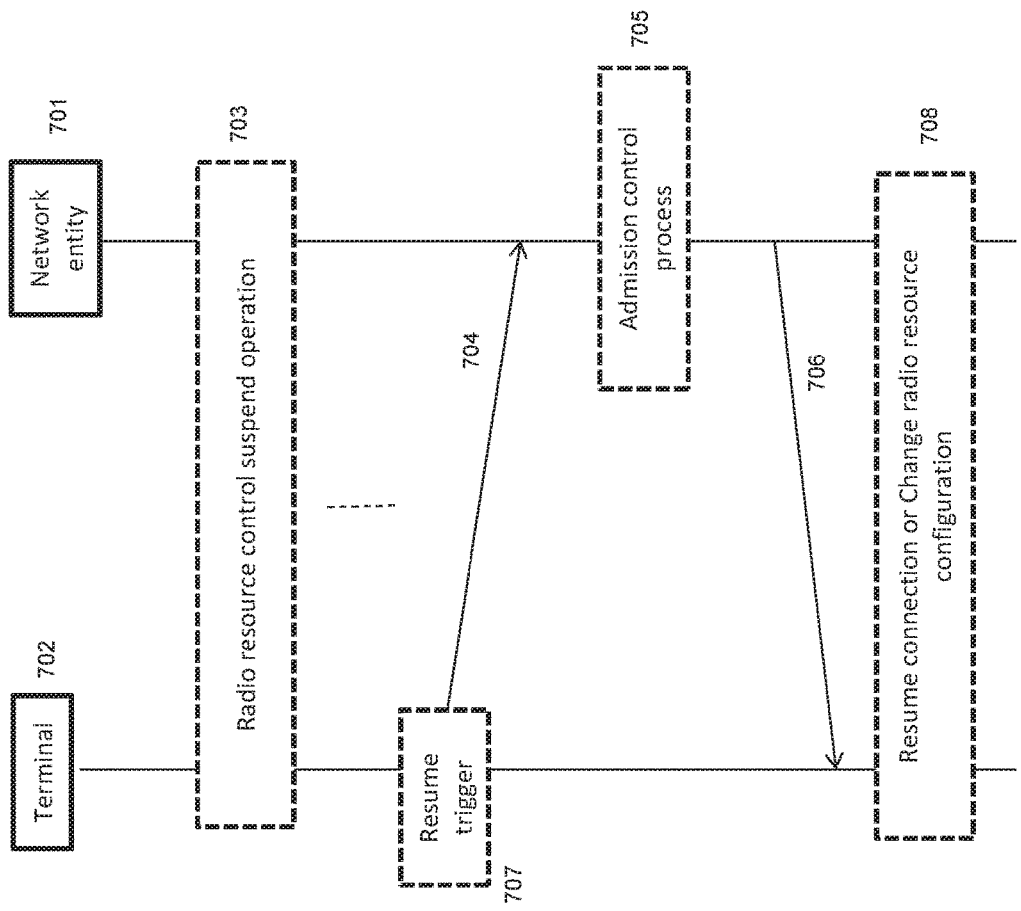
FIG. 7 schematically shows an embodiment of a radio resource control method.

Embodiments of the invention can be applied to a system as shown schematically in FIG. 7. A network entity 701 is arranged for communication over one or more radio resources (e.g. bearers) with a terminal 702. Terminal 702 could be a terminal 101 as shown in FIG. 1, and network entity 701 could be node of a network 110 as shown in FIG. 1.

Reference numeral 703 indicates that a radio resource control suspend operation of the above described kind has been performed. Subsequently, the terminal 702 is in an idle or suspended state. At a later point in time one of the elements determines that a radio resource control resume condition is given, 707, so that a radio resource control resume operation is initiated. In the example of FIG. 7 it is assumed that the terminal 702 initiates the resume process by sending a radio resource control resume message 704 to the network entity 701. For example, the terminal 702 may have data to transmit and therefore requests resumption of the connected state, i.e. the transition from an idle state into an active state. However, it is to be noted that the radio resource control resume condition can also be detected in a different node, e.g. in the network entity 701, which might want to enter a connected state e.g. in order to convey control signaling to the terminal 702, or in another node of the communication network to which network entity 701 belongs, e.g. a node of a communication control network belonging to network 110, e.g. in the event that downlink data for the terminal 702 is waiting.

In response to the triggering condition, the network entity 701 performs an admission control process 705 comprising a procedure for examining whether the connected state is to be resumed according to the stored radio resource configuration information or if a radio resource reconfiguration procedure is to be performed for resuming the connected state.

The result of the admission control process is communicated to the terminal 702 in a control message 706 and the connection is then resumed according to the result, 708. However, it is noted that this is only one possibility, and the resumption of the connected state could also already have begun for the terminal 702 when detecting the resume condition by then setting the radio resources in accordance with the radio resource configuration information stored during suspend operation 703. Accordingly, the network entity 701 can then also resume the connection by setting the radio resources in accordance with the radio resource configuration information stored during suspend operation 703 after receiving message 704. If as a result of the admission control process 705 the connected state is to be resumed according to the stored radio resource configuration information, then message 706 could be a simple confirmation message and procedure 708 would simply be to continue as configured. If as a result of the admission control process 705 the connected state is to be resumed on the basis of a radio resource reconfiguration procedure, then message 706 could comprise radio resource reconfiguration information indicating which changes are to be performed with respect to the radio resource configuration information stored during suspend operation 703 or indicating a new set of settings for the radio resources. Procedure 708 would then be to change the radio resource configuration accordingly.

Figure 8:
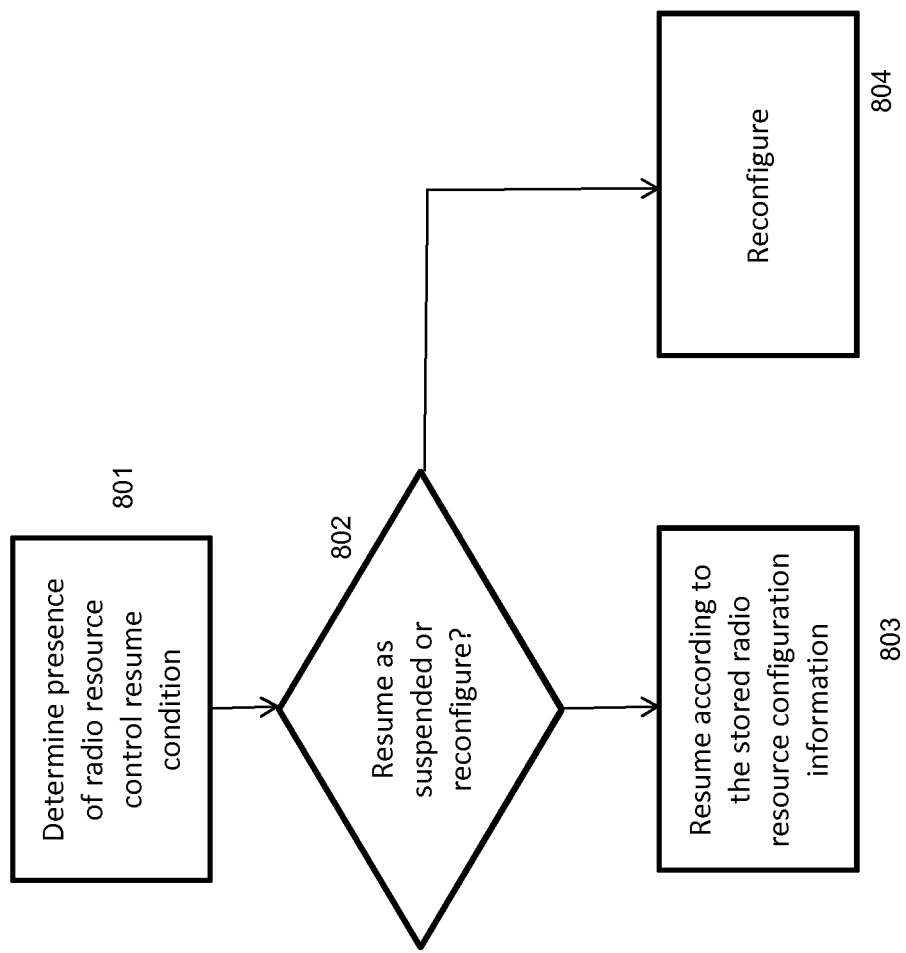
FIG. 8 schematically shows a flow chart of an example of an admission control process.

FIG. 8 shows a flow chart of a basic method embodiment of the admission control process 705 as executable by the network entity 701. Step 801 indicates that it is determined that a radio resource control resume condition is present, e.g. by receiving a corresponding message. Process 802 examines whether the connected state is to be resumed as it was suspended (i.e. with the same radio resource configuration) or whether a reconfiguration is to be performed. In the event of deciding to resume as suspended, the procedure branches to process 803 and in the event of deciding to resume with a reconfigured set of radio resources, the procedure branches to process 804.

The decision 802 for whether to resume the connected state based on the configuration of radio resources as stored in the suspend operation or whether to reconfigure the radio resources can be chosen and implemented in any suitable or desirable way. For example, it can be based on one or more of the following considerations:

availability of radio resources at the terminal 702,
availability of radio resources at the network entity 701,
availability of radio resources in the communication network 110 to which the network entity 701 belongs,
traffic load in the communication network 110 to which the network entity 701 belongs,
type of information to be communicated in resumed connected state, e.g. signaling and data or only signaling,
required or desired bandwidth for resumed connection.

The radio resource reconfiguration procedure 804 can be provided in any suitable or desirable way. For example, it may comprise one or more of (a) examining which radio resources among said set of radio resources associated with said configured connected state are to be admitted according to the stored radio resource configuration information;

(b) examining which radio resources among said set of radio resources associated with said configured connected state may be admitted after modification compared to the stored radio resource configuration information; the modification can be chosen in any suitable or desirable way and may especially relate to quality of service parameters, e.g. associated with one or more of bandwidth, latency, throughput, error rate, average bit rate, guaranteed bit rate, scheduling priority, and packet delay budget.

(c) examining which radio resources among said set of radio resources associated with said configured connected state may not be admitted;

(d) examining whether new radio resources different from said set of radio resources associated with said configured connected state may be added when resuming the connected state.

According to another embodiment, the admission control process comprises a decision procedure within step 802 for deciding whether the connected state is to be resumed using only radio resources dedicated to communicating signaling or the connected state is to be resumed using both radio resources dedicated to communicating signaling and radio resources dedicated to communicating data. In order to indicate whether the resumed connection is to serve for data traffic transmission or purely for signaling message exchange, another node of the communication network (e.g. a communication control node, such as an MME) indicates to the network entity 701 (e.g. an access network node such as an eNodeB) that radio resources dedicated to communicating data (e.g. Data radio bearers (DRBs)) are needed to be established for the terminal 702 about to resume, or that only radio resources dedicated to communicating signaling (e.g. signaling radio bearers (SRBs)) are needed. Such indication may be for example be due to the fact that the communication network requests the terminal not to transmit any data but to perform signaling procedures such as tracking area update, for which radio resources dedicated to communicating data are not needed. In such cases it would be useful that the indication transmitted by the communication network to network entity 701 is also passed to the terminal 702, so that the terminal 702 is informed.

According to a further embodiment, the decision procedure comprises checking a dedicated flag in a received message for triggering said radio resource control resume operation, where one value of the flag indicates using both radio resources dedicated to communicating signaling and radio resources dedicated to communicating data and another value of the flag indicates using only radio resources dedicated to communicating signaling. The flag can be as simple as a single bit. For example the communication network may send an indication of a resume procedure which does not require any radio resources dedicated to communicating data via such a new flag in a suitable message e.g. a Paging message. Once the network entity 701 receives the message from the communication network, it can create a corresponding message (e.g. paging message) over the air aimed at triggering the terminal 702 to resume the connection. The indication of whether to resume only with signaling or with signaling and data received by the network entity 701 may be mapped into such a message sent over the air. The terminal receiving this message may avoid requesting radio resources dedicated to communicating data, even if the radio resource configuration information stored at the time of suspending the terminal may include radio resources dedicated to communicating data. This embodiment further helps managing resources efficiently because it avoids setting up radio resources dedicated to communicating data when they are not needed.

Figure 9:
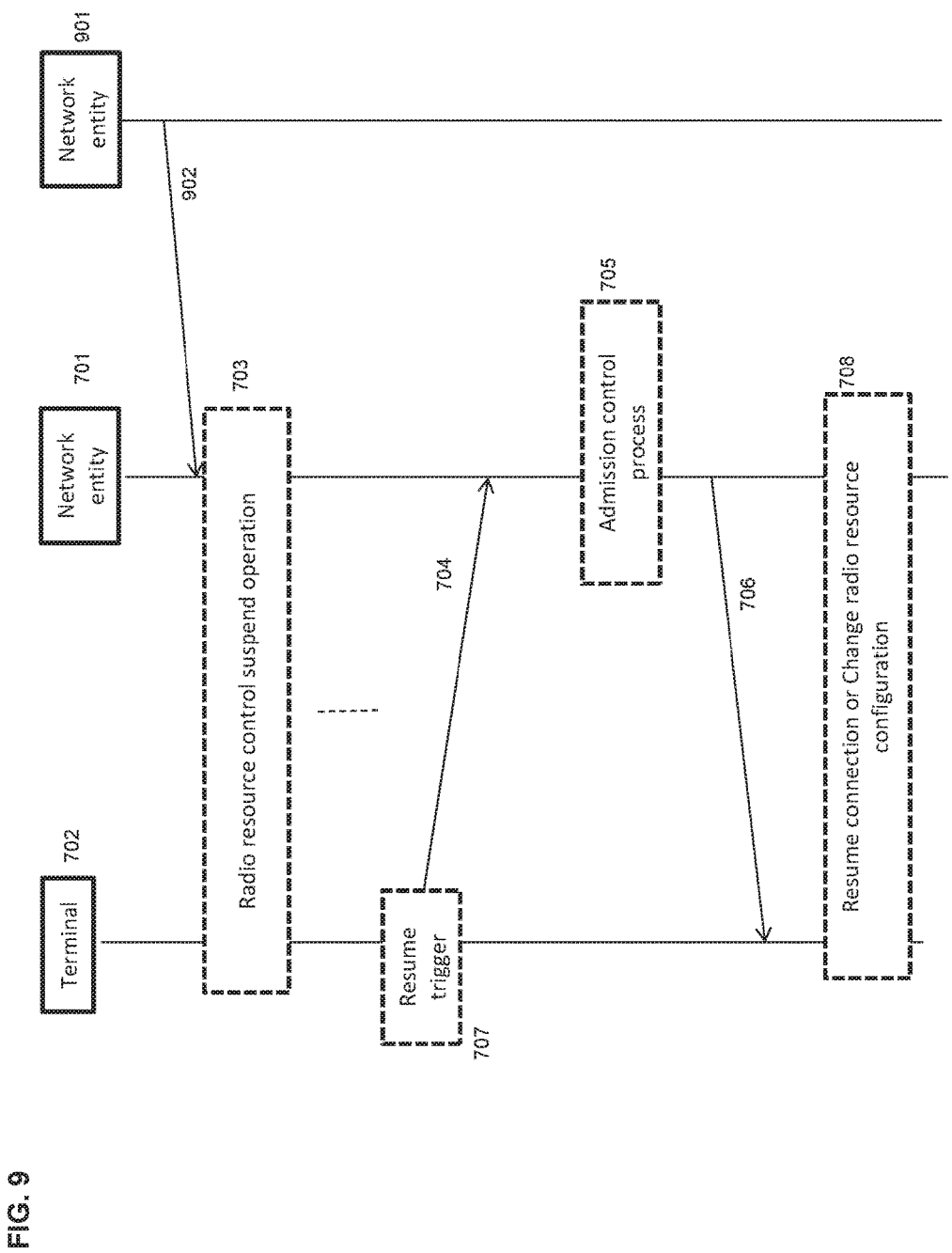
FIG. 9 schematically shows another embodiment of a radio resource control method.

According to an embodiment, the communication network comprises an access network and a communication control network, and the communication network entity 701 is an access network entity, e.g. a base station, such as a NodeB or an eNodeB. This is exemplified in FIG. 9 by showing a network entity 901 that belongs to the communication control network, e.g. a core network. In a further embodiment, the radio resource reconfiguration procedure 804 may then comprise referring to a reconfiguration framework record whose contents are set dependent on information received from the communication control network. For example, with an appropriate message 902 a communication control network entity (e.g. a MME) 901 may indicate to the network entity 701 (e.g. an eNodeB) at time of creation of the radio resource configuration information to be stored or at activation of the corresponding radio resources whether changing/negotiation of parameters, e.g. QoS parameters is possible at the communication control network entity, and if yes, the communication control network entity 901 may optionally indicate which parameters may be subject to changes, for example indicating ranges or distinct values to choose from. The communication control network entity 901 could have service related information indicating that changing parameters is not possible for any service or for some specific ones. Considering that the access network (e.g. RAN) might have more resources available the next time the terminal resumes, it could be foreseen that the changed parameters are only applicable until the terminal is suspended again to RRC IDLE or RRC-SUSPEND. Namely, the original parameters with which the radio resource configuration information or radio resource setup was performed are used at the next resume, which would require the network entity 701 and communication control network entity 901 to keep the original parameters and to apply them to resume procedures where no changes are requested.

Now a further embodiment will be described with reference wo FIG. 10. In this example, just like in the example of FIG. 9, a network entity 701, e.g. in an access network, and a network entity 901, e.g. in a communication control network, are present. The admission control process 1001 performed in network entity 701 comprises sending a radio resource proposal message 1002 to the communication control network. Network entity 901 equally is arranged for performing an admission control process 1003, which comprises receiving the radio resource proposal message 1002 from network entity 701, and the sending a response message 1004 related to said radio resource proposal message in return. The process 1001 of entity 701 furthermore comprises receiving the response message 1004. Both entities 701 and 901 subsequently operate the resumed connected state in dependence on the content of said response message.

The admission control process 1003 performed in network entity 901 can be an admission control process according to any of the above embodiments, e.g. as described in connection with FIG. 8.

The radio resource proposal message 1002 may be one of
  a radio resource confirmation message confirming the radio resource configuration information comprised in the radio resource control information stored during the radio resource control suspend operation 703; and
  a radio resource reconfiguration message comprising radio resource reconfiguration information for operating the resumed connected state with radio resources reconfigured with respect to the resource control information stored during the radio resource control suspend operations 703.

The response message 1004 may be one of
  an acknowledgment message confirming operating the resumed connected state according to the radio resource proposal message; and
  a new radio resource reconfiguration message comprising radio resource configuration information modified with respect to the radio resource proposal message sent to said communication control network.

Figure 10:
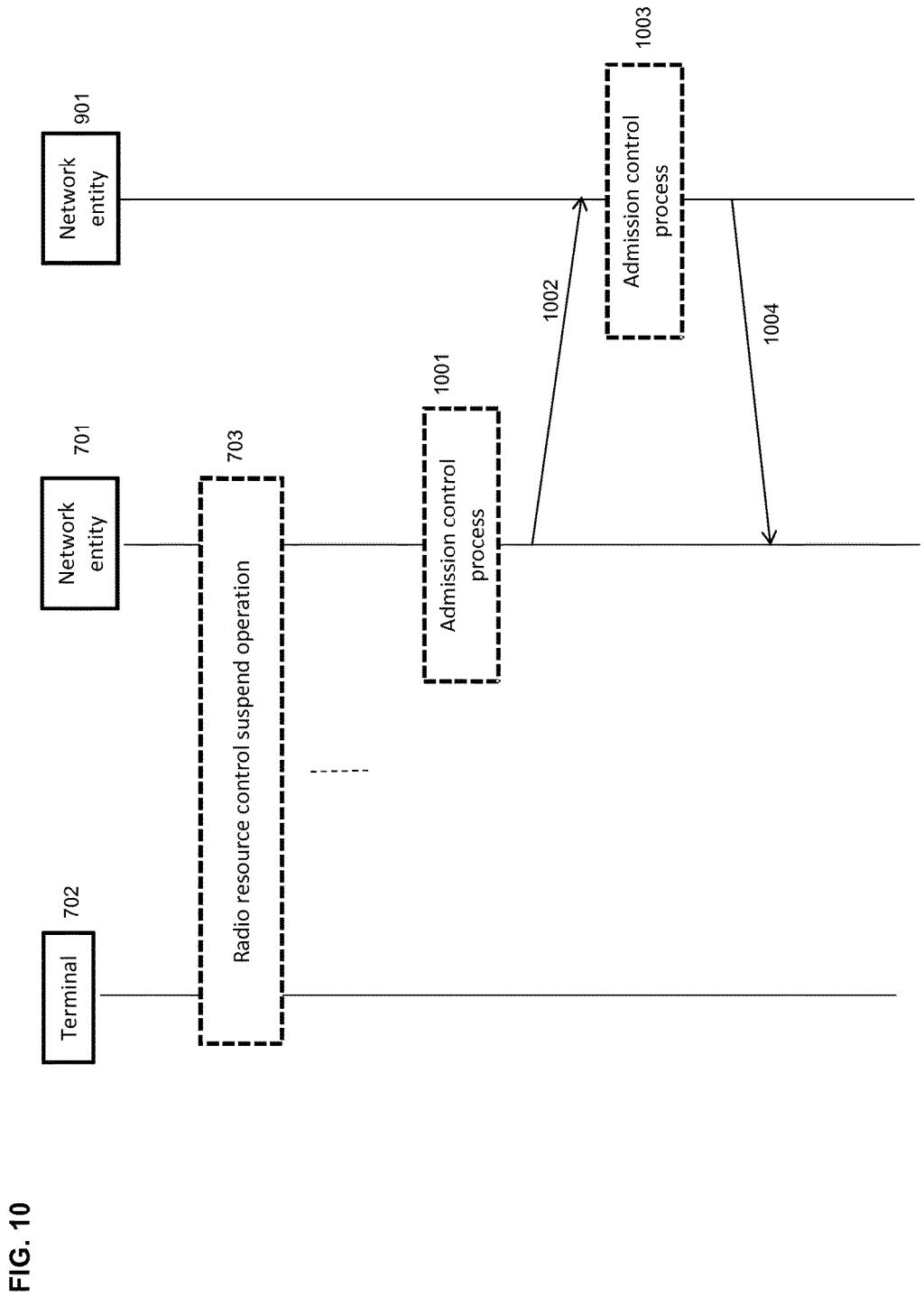
FIG. 10 schematically shows another embodiment of a radio resource control method.
Figure 11:
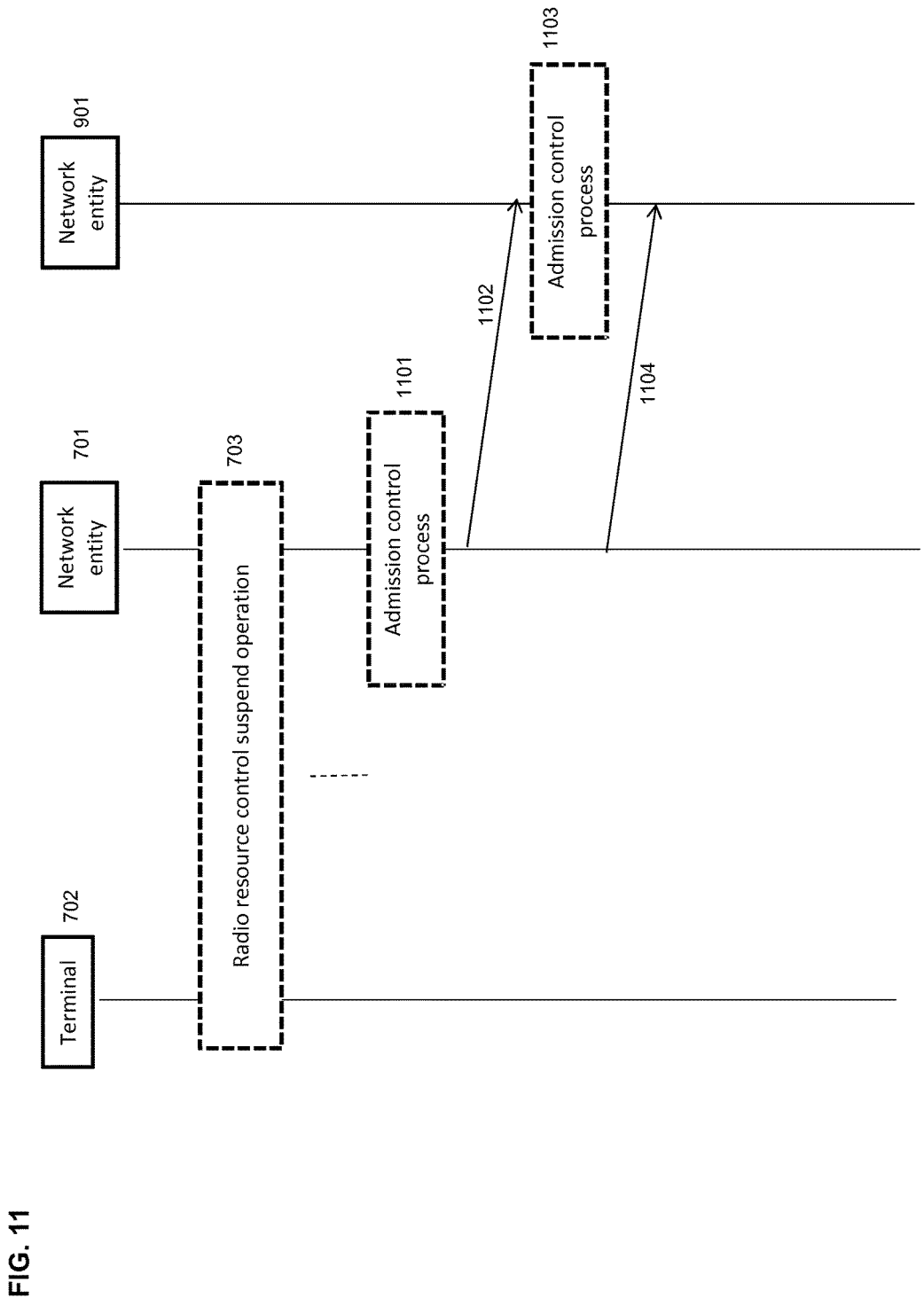
FIG. 11 schematically shows another embodiment of a radio resource control method.

According to a further embodiment exemplified in FIG. 11, which shows the same structure as FIG. 10, the admission control process 1101 of entity 701 comprises sending a first radio resource proposal message 1102 to the communication control network at a first time, and if subsequent to said first time it is determined that a radio resource proposal revision condition is given, sending a second radio resource proposal message 1104 associated with different radio resource configuration information than the first radio resource proposal message 1102 to the communication control system. The admission control process 1103 of entity 901 may then comprise receiving the first radio resource proposal message 1102 from at a corresponding first time, and subsequently performing a monitoring procedure for determining whether a second radio resource proposal message 1104 is received that is associated with different radio resource configuration information than the first radio resource proposal message 1102.

Preferably, the process in entity 701 of determining whether a radio resource proposal revision condition is given is only performed within a predetermined time window after the first time. Equally, the monitoring procedure in entity 901 is only performed within a predetermined time window after the corresponding first time.

The embodiments described in connection with FIG. 11 have the advantage of avoiding a radio resource configuration in the case of a temporary change in conditions that led to the determination in step 802 that a reconfiguration should take place. As a consequence, the radio resource proposal revision condition can be chosen in any suitable or desirable way in association with the decision 802 described above and can be based on a predetermined change (e.g. exceeding a predetermined threshold) for one or more of the following considerations:
  availability of radio resources at the terminal 702,
  availability of radio resources at the network entity 701,
  availability of radio resources in the communication network 110 to which the network entity 701 belongs, traffic load in the communication network 110 to which the network entity 701 belongs, type of information to be communicated in resumed connected state, e.g. signaling and data or only signaling, required or desired bandwidth for resumed connection.

Embodiments according to FIG. 11 can be such that the entity 901 (e.g. an MME) receiving a request from the entity 701 (e.g. a RAN entity, such as an eNodeB) to modify the radio resource setup for the terminal that requested to resume may not apply the modifications immediately but it may wait for a given amount of time in order to ensure that the conditions that triggered the request from the entity 701 are not temporary. In this case the entity 701 would setup the radio resources as per saved resource configuration information and it will notify the entity 901 with message 1102 that modifications should be applied to the radio resources as per previous embodiments. The entity 901 may accept the modifications but wait before applying them to the established radio resources. If the conditions at entity 701 are such to allow radio resources to be re-established as it was originally stored in the resource configuration information, the entity 701 may notify the entity 901 that the previous changes may not be needed and the entity 901 may maintain the resource configuration information unchanged. If the time window within which the entity 901 waits before applying the changes expires, the entity 901 will modify the resource setup as requested by the entity 701.

In another variation the entity 901 receiving a request from the entity 701 to modify the radio resource setup for the terminal that requested to resume may not apply the modifications immediately but it may wait for a given amount of time in order to ensure that the conditions that triggered the request from the entity 701 are not temporary. In this case the entity 701 could setup the radio resources with the modifications applied and it will notify the entity 901 at message 1102 that modifications have been applied to bearers as per previous embodiments. The entity 901 may accept the modifications but wait before applying them to the established radio resources. If the time window within which the entity 901 waits before applying the changes expires, the entity 901 will modify the radio resource setup as requested by the entity 701.

For all of the above described embodiments, as already described above in connection with message 706, if the connected state is to be resumed with a set of radio resources configured differently than determined by the radio resource control information stored during the radio resource control suspend operation, then the method may comprise sending to the terminal 702 a radio resource control communication reconfiguration message comprising radio resource reconfiguration information belonging to a set of reconfigured radio resources.

According a further embodiment, one or more of the admission control processes 705, 1001, 1003, 1101, 1103 is arranged such that signaling connections as identified in the radio resource control information stored during the radio resource control suspend operation are left unchanged even if a radio resource reconfiguration procedure is to be performed for operating the resumed connected state. The advantage of this technique is that if the terminal 702 is resumed using the same network entity 701 (e.g. eNodeB(s)) as at the time of suspending the connection, the stored signaling connection IDs enable the communication control network node(s) (e.g. MME and S-GW) to reuse them when starting to send buffered DL data towards the terminal 702. The handling is advantageous when the terminal resumes at the same entity 701 triggered by paging caused by DL data since it has the potential of reducing the lead time needed to connect the terminal.

Now further more detailed embodiments will be described, which refer to elements and protocols of an EPS/LTE system. The radio resources are embodied as bearers, and the radio resource control information is embodied as a UE context.

Figure 14:
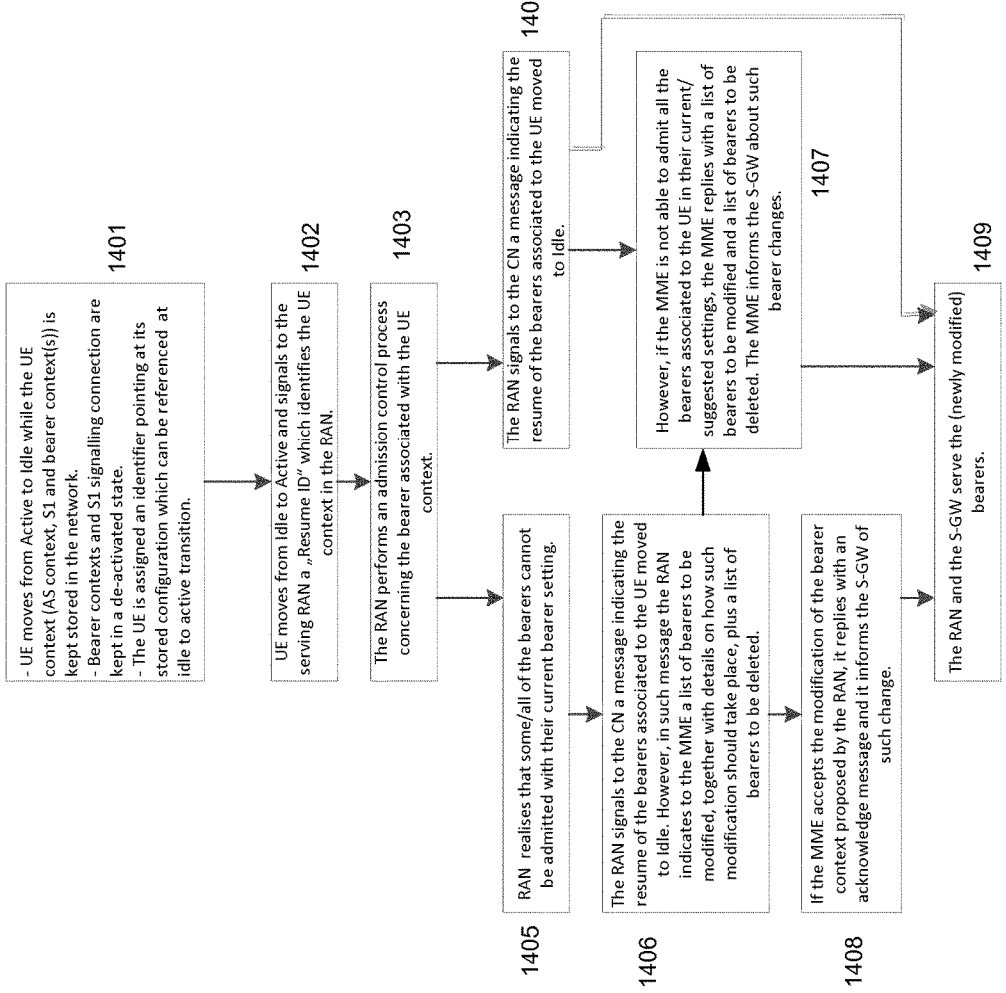
FIG. 14 schematically gives an overview of a radio resource control method according to a further embodiment.

FIG. 14 shows an overview of steps taken in a UE (User Equipment), a RAN (Radio Access Network) and a CN (Core Network).

As shown in 1401, when performing the suspend operation, the UE moves from Active to Idle while the UE context (AS context, S1 and bearer context(s)) is kept stored in the network. Bearer contexts and S1 signaling connections are kept in a de-activated state. The UE is assigned an identifier pointing at its stored configuration which can be referenced at idle to active transition, i.e. when resuming. As shown in 1402, it is assumed that the UE wishes to resume the connection thus moves from Idle to Active and signals to the serving RAN a "Resume ID" which identifies the UE context in the RAN. As shown in 1403, the RAN then performs an admission control process concerning the bearer associated with the UE context. As shown in 1404, the RAN then signals to the CN a message indicating the resume of the bearers associated to the UE when it moved to Idle. As shown in 1405, the RAN is assumed to have determined that some/all of the bearers cannot be admitted with their current bearer setting. As shown in 1406, the RAN then signals to the CN a message indicating the resume of the bearers associated to the UE when it moved to Idle. However, in such message the RAN indicates to the MME a list of bearers to be modified, together with details on how such modification should take place, plus a list of bearers to be deleted. As shown in 1407, if the MME is not able to admit all the bearers associated to the UE in their current/suggested settings, the MME replies with a list of bearers to be modified and a list of bearers to be deleted. The MME informs the S-GW about such bearer changes. As shown in 1408, if the MME accepts the modification of the bearer context proposed by the RAN, it replies with an acknowledge message and it informs the S-GW of such change. As shown in 1409, the RAN and the S-GW subsequently serve the (newly modified) bearers.

In these embodiments, methods are described that enable the RAN and the CN to determine whether and which of the bearers associated with a UE context that has been suspended can be resumed. RAN and CN would be enabled to only serve bearers for which resources can be admitted at resume. After checking whether the bearers can be admitted, the RAN and the CN exchange with each other signaling messages that confirm bearer admission according to the bearers setting stored in the UE AS context or alternatively that indicate which bearer modification need to be applied to the stored set of bearer configurations in order for a new modified list of bearers (where the modification can either be on existing bearers configuration or on the overall list of bearers) to be admitted.

In one embodiment, the concept is applied to the case where the serving RAN receives an indication of connection resume triggered by a UE or triggered by the CN, where the UE was previously sent to Idle and for which the UE context was suspended. In this case the RAN, upon retrieving the UE bearer context, may determine that the UE bearers cannot be admitted, for example due to RAN load conditions. The RAN would therefore determine, for example via running an admission control procedure, which bearers can be admitted without changes, which bearers should be modified and which bearers should be removed. The RAN would therefore indicate in a message to the MME that the UE radio resources needs to be re-established but in the same message the RAN could describe the modifications to the UE bearer context that are needed in order to admit the UE bearers. In this example the MME could accept the suggested bearer changes proposed by the RAN or the MME could propose further changes mandated by its own conditions, for example associated with traffic load. After the MME replies to the RAN either confirming the RAN changes or proposing further changes, the newly modified bearers are activated in the RAN. The MME also communicates the applied bearer changes to the S-GW. If the MME proposes further changes to the bearer configurations, the admitted bearers will respect the final configuration provided by the MME. Otherwise the configuration provided by the RAN would be admitted.

In one embodiment depending on the previous one, the RAN indicates to the MME only a list of bearer radio resources that were successfully admitted and a list of bearers for which radio resources failed to be setup (alternatively RAN only includes a list of bearers that are admitted, thereby implicitly indicating that all not listed bearers (which are known to the MME) are not admitted). The MME receiving such indication can accept the new bearer configuration by sending an acknowledgement message.

Optionally, the MME may reply to the indication of reduced bearer list from the RAN with a message further indicating other bearer modifications. Such bearer modifications may consist of a further reduction of the overall list of bearers setup for the UE, namely the MME would notify the RAN of other bearers that failed to be re-established.

In another embodiment the RAN may indicate as part of the resume signaling to the MME that some bearers need QoS (Quality of Service) modifications. Such notification may occur by including in the resume request, i.e. the S1AP: UE Context Active message (S1AP=S1 Application Protocol), a list of bearers to be modified and for each bearer to specify the new QoS parameters the RAN would prefer to assign. One reason for such request from the RAN could be lack of resources that would make it impossible to serve bearers with their current QoS setup, or, that more resources are available than associated with current QoS. For example, the RAN may request for a change in average bit rate for a specific bearer or for a change in guaranteed bit rate. The MME receiving such request may reply by accepting it. In another embodiment, the MME receiving such request may respond with new QoS parameters for the bearers the RAN requested to be modified. The RAN may accept or reject such parameters.

In another embodiment, the RAN may indicate as part of the resume signaling to the MME that some bearers need QoS modifications. Such notification may occur by including in the resume request, i.e. the S1AP: UE Context Active message, an indication that a changed QoS is requested for some/all of the bearers to be re-established. Such indication may be in the form of a new IE (Information Element), assigned per bearer, with a cause value set to, e.g. "change QoS". The MME receiving such indication may respond to the RAN with a message including new QoS parameters for the bearers affected, where such new QoS parameters indicate a change in QoS configuration, for example one or more of lower average bit rate, lower guaranteed bit rate, lower scheduling priority, lower packet delay budget. In another embodiment the MME receiving a request from the RAN to modify the bearer context for the UE that requested to resume may not apply the modifications immediately but it may wait for a given amount of time in order to ensure that the conditions that triggered the request from the RAN are not temporary. In this case the RAN could setup the bearers as per saved UE bearer context and it will notify the MME at S1AP: UE Context Activate that modifications need to be applied to bearers as per previous embodiments. The MME may accept the modifications but wait before applying them to the established bearers. If the RAN conditions are such to allow bearers to be re-established as it was originally stored in the UE bearer context, the RAN may notify the MME that the previous changes may not be needed and the MME may maintain the bearer context unchanged. If the time window within which the MME waits before applying the changes expires, the MME will modify the bearer context as requested by the RAN.

In another embodiment the MME receiving a request from the RAN to modify the bearer context for the UE that requested to resume may not apply the modifications immediately but it may wait for a given amount of time in order to ensure that the conditions that triggered the request from the RAN are not temporary. In this case the RAN could setup the bearers with the modifications applied and it will notify the MME at S1AP: UE Context Activate that modifications have been applied to bearers as per previous embodiments. The MME may accept the modifications but wait before applying them to the established bearers. If the time window within which the MME waits before applying the changes expires, the MME will modify the bearer context as requested by the RAN.

In another embodiment of the method described, after the UE or the CN trigger a resume procedure, the RAN may check whether the stored UE bearers' configuration can be admitted and it may decide that admission can be granted. The RAN would therefore signal to the MME a message indicating that the UE context should be resumed and that the stored UE bearer configuration should be reactivated. The CN, namely the MME, may run a check on whether the stored UE bearer configuration can be activated and it may identify that this is not possible for example due to internal load conditions. Hence, the MME may signal the RAN with a message that includes a list of bearers, out of the bearers stored in the UE context, that need to be modified or removed. The RAN may accept such changes and re-establish the modified bearers accordingly. The MME may in this case request the P-GW (Packet Data Network Gateway) to confirm the bearer changes.

It should be noted that the RAN should also modify the bearer context configuration towards the UE in case the bearers context to be resumed is different from the one stored when the UE was suspended. Such modification at the UE may occur before triggering signaling procedures for resume between the eNB and the MME or after that. Accordingly, NAS (Non-Access Stratum) signaling between the UE and the MME may take place to notify of the bearer context modification.

Figure 15:
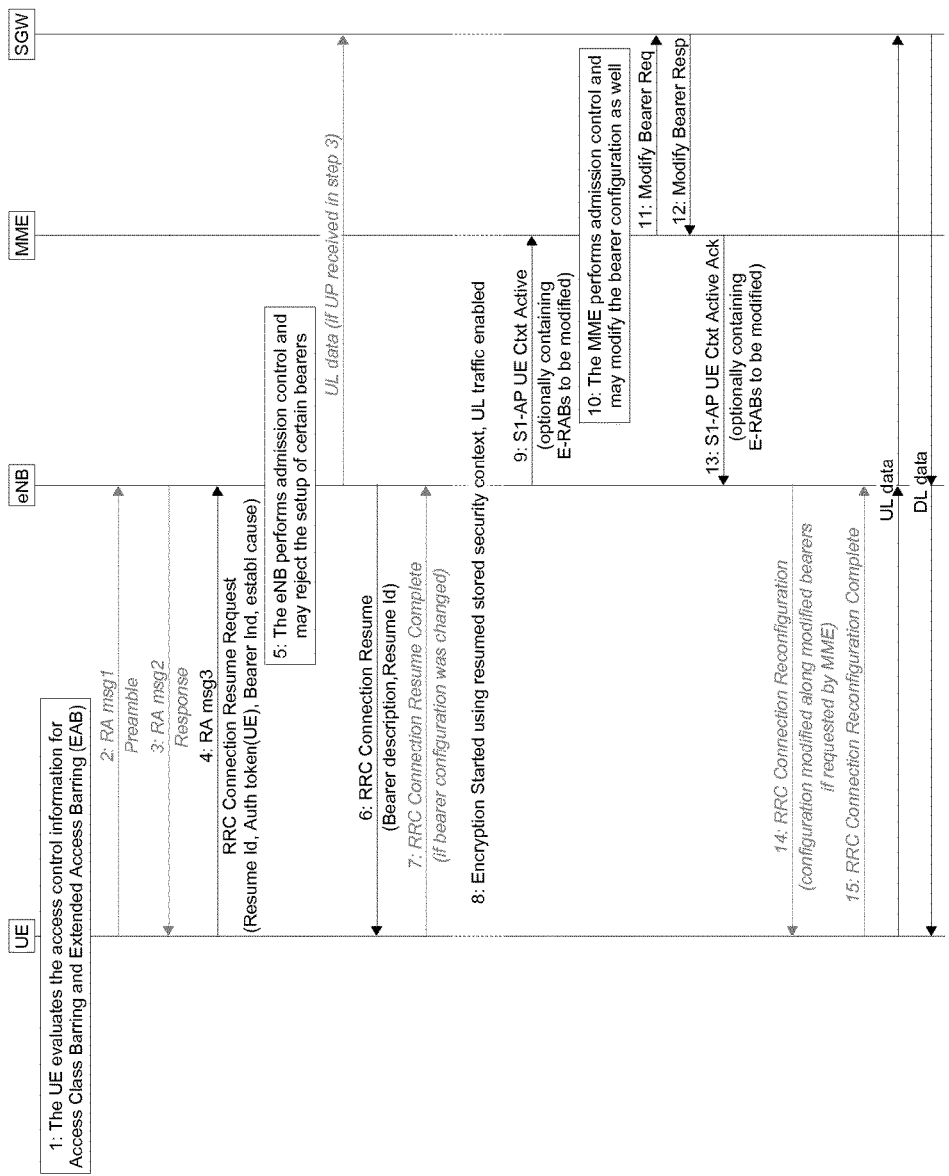
FIG. 15 schematically gives an overview of a radio resource control method according to another embodiment.

FIG. 15 gives an overview of processes and messages performed in a system as described previously with reference to FIG. 6. In comparison with FIG. 6, it is to be noted that admission control procedures 5 and 10 have been added, corresponding to processes 1001, 1003 and 1101, 1103 described previously. More specifically steps 1-4 are as described in connection with FIG. 6. The eNB performs admission control in step 5 and decides, as an example, to not re-establish all suspended bearers. Consequently, the response message on RRC, step 6, will contain an updated bearer configuration, and step 7 (which otherwise corresponds to message 5 of FIG. 6) is the acknowledgment from the UE for the new bearer configuration. Step 8 corresponds to step 6 of FIG. 6, and Step 9 (which otherwise corresponds to message 7 of FIG. 6) would then contain S1AP level information which informs the MME about the updated bearer configuration. An example for an Information Element that may contain such S1AP level information is depicted in FIG. 16, which shows example of information to be included in the S1: UE Context Active/Ack message.

Also the MME may decide to not admit all bearers, in which case further signaling (indication in step 13 and steps 14-15) is necessary. In the latter case information similar to those shown in FIG. 16 can be added to the message sent by the MME to the eNB, namely the S1: UE Context Active Ack.

Another possible implementation of the information conveyed in the S1: UE Context Active and S1: UE Context Active Ack is shown in FIG. 17. In FIG. 17 information concerning removed bearers is provided by adding a list of E-RABs that failed to be setup in the S1: UE Context Active and/or S1: UE Context Active Ack.

It should be noted that both in FIG. 16 and in FIG. 17 the E-RAB Level QoS Parameters IE is optional. Namely, the QoS parameters meant to be newly assigned to an E-RAB at resume may not be included because the RAN and/or MME do not support the function of modifying bearer's configuration at resume.

According to FIG. 16 the information consists of a list of E-RABs to be modified and a list of E-RABs that are not subject to any modification. The overall list of E-RABs (modified and not modified) included in the message consists of the E-RABs for which context was stored at the time when the UE was suspended.

It can be appreciated from FIG. 16 that the E-RABs to be modified list contains a removal indication. If such IE indicates removal it means that the eNodeB or the MME request to remove the corresponding E-RAB.

In FIG. 17 it is shown how three lists of E-RABs are included. One list considers E-RABs to be modified and includes details on how they would need to be modified. Another list indicates the E-RABs to be setup, i.e. those E-RABs for which the bearer context did not change since the UE was suspended. The third list contains E-RABS that failed to setup, namely those E-RABs for which the eNodeB requests removal to the MME.

According to the embodiments above the eNodeB has the possibility to reconfigure the UE with the new E-RAB configuration signaled to the MME. Such reconfiguration may happen either before the eNodeB starts signaling the MME or after, once the MME response is received.

In case the information represented in FIG. 16 and FIG. 17 are provided by the MME to the eNodeB in the message that acknowledges the resume request from the eNodeB, namely the S1: UE Context Active Ack, the MME is able to indicate to the eNodeB which E-RABs can be admitted at the core network, which E-RABs cannot be admitted and which E-RABs need to be modified. In the latter case where the MME indicates changes to the UE context requested to be established by the eNodeB, the eNodeB should accept the changes and reconfigure the UE via RRC protocol signaling in a way to specify to the UE the new E-RAB setting suggested by the MME.

In another embodiment of this invention the eNodeB signaling to the MME a message indicating a resume request for a UE previously suspended may not include Downlink Tunnel Endpoint IDs (DL TEIDs).

That implies that the MME stores the DL TEIDs for the S1 signaling connection associated to the UE for each UE bearer at the time the UE is suspended.

The advantage of this technique is that if the UE is resumed using the same eNodeB(s) the stored DL TEIDs enables the MME and S-GW to reuse them when starting to send buffered DL user data over the S1-U interface.

The handling is advantageous when the UE resumes at the same eNodeB triggered by paging caused by DL user data since it has the potential of reducing the lead time needed to connect the UE.

Some of the advantages of storing the DL TEIDs at the MME and not communicate new ones at S1: UE Context Active are as follows:

With no re-use of DL TEIDs for other UEs there is less risk of passing DL user data related to a different UE;

EPC may apply an optimized transition to connected state at S-GW, i.e. "just" flipping a switch instead of first assigning new DL TEIDs;

A first UL data arriving at S-GW may be used as a trigger to start DL user data transfer. Namely, given that the DL TEIDs have not been removed from the S-GW either and are safely stored there, the S-GW can enable DL data transfer for the UE on the stored DL TEIDs as soon as UL data for the same UE are received;

S-GW knows that the UE resumed at the same eNodeB since UL data arrives at UL TEIDs without a preceding Modify Bearer Request message received;

Data from same eNodeB is a trigger to S-GW to re-use existing DL TEIDs.

In addition to the embodiments above another method is proposed according to which the MME may indicate to the eNodeB at UE Context creation or at bearer activation whether changing/negotiation of QoS parameters is possible at the MME and if yes, the MME may optionally indicate which QoS parameters may be subject to changes, probably indicating ranges or distinct values to choose from. The MME could have service related information indicating that changing QoS parameters is not possible for any service or for some specific ones.

Considering that the RAN might have more resources available the next time the UE resumes, it could be even foreseen that the changed QoS parameters are only applicable until the UE is suspended again to RRC_IDLE. Namely, the original QoS parameters with which the UE Context or bearer setup was performed are used at next resume, which would require the eNodeB and MME to keep the original QoS parameters and to apply them to resume procedures where no QoS changes are requested.

In another embodiment, in order to indicate whether the UE resume is due to data traffic transmission or purely to signaling message exchange, the CN indicates to the eNodeB that Data radio bearers (DRBs) are needed to be established for the UE about to resume or that only signaling radio bearers (SRBs) are needed. Such indication may be for example be due to the fact that the network requests the UE not to transmit any data but to perform signaling procedures such as tracking area update, for which DRBs are not needed. In such cases it would be useful that the indication transmitted from CN to eNodeB is also passed to the UE, so that the UE is informed. For example the CN may send indication of a resume procedure which does not require any DRBs via a new flag in the Paging message. This new flag can specify whether the resume should happen by only setting up SRBs or if it needs also DRBs setup as per stored UE bearer context. Once the RAN receives a paging message from the CN it will create a paging message over the air aimed at triggering the UE to resume. The indication of a DRB or SRB resume received by the RAN may be mapped also in such message sent over the air. The UE receiving this message may avoid requesting DRBs, even if the UE bearer context stored at the time of suspending the UE may include DRBs. This enhancement further helps managing resources efficiently because it avoids setting up DRBs when they are not needed.

Figure 12:
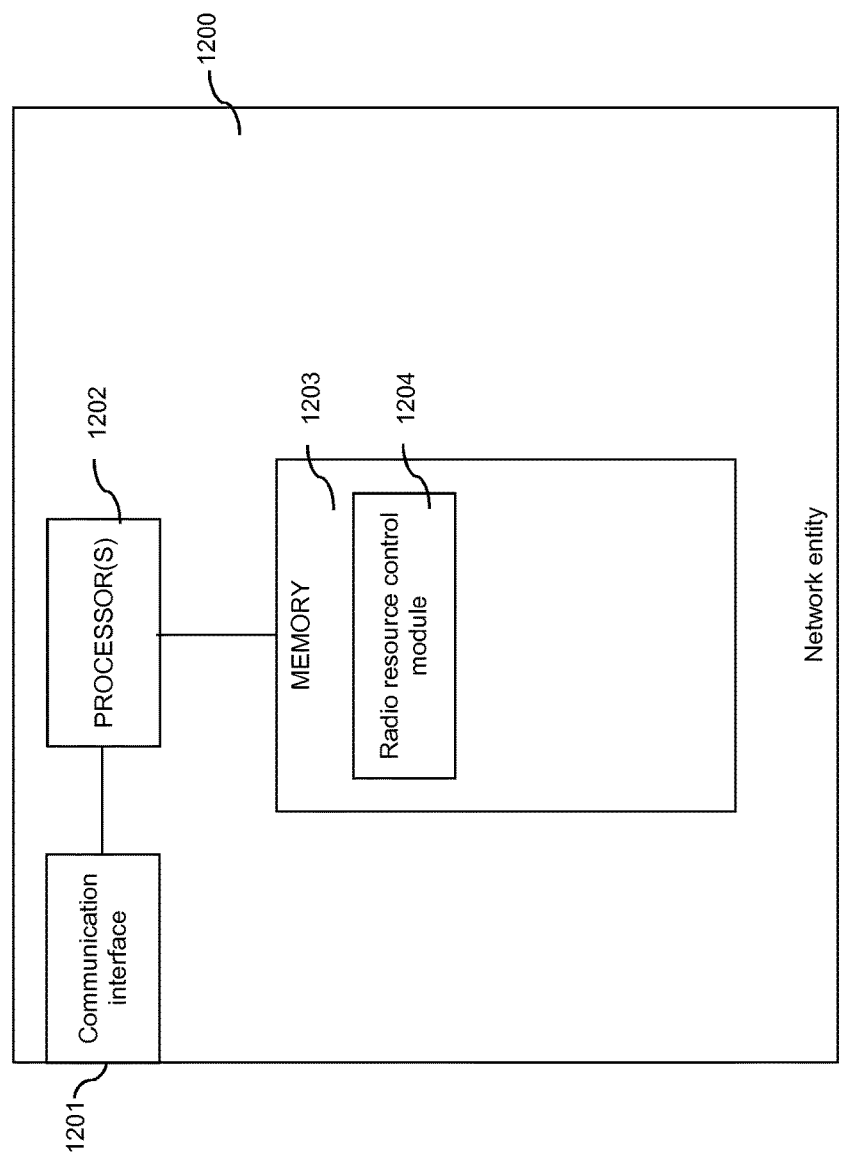
FIG. 12 shows a block diagram of a network entity.

The inventive concept can also be embodied in the form of a communication network entity, such as entity 701 or 901. FIG. 12 shows a schematic block diagram in which a network entity 1200 has a communication interface 1201 for communication with a terminal and with other network entities, one or more processors 1202 for executing control operations, and a memory system 1203 arranged to comprise both control instructions (e.g. in the form of software code parts) forming a radio resource control module 1204. The communication network entity 1200 comprises a radio resource controller (e.g. the code parts of module 1204 when loaded for execution into processor 1202) arranged for performing an admission control process according to any of the above described embodiments.

The invention can also be embodied as a computer program product comprising computer program code parts arranged for performing the method of one of any of the above method embodiments when executed on a processing system of a communication network entity, e.g. processor 1202. Equally, the invention can be embodied as a memory system carrying the corresponding computer program product, e.g. memory system 1203.

Figure 13:
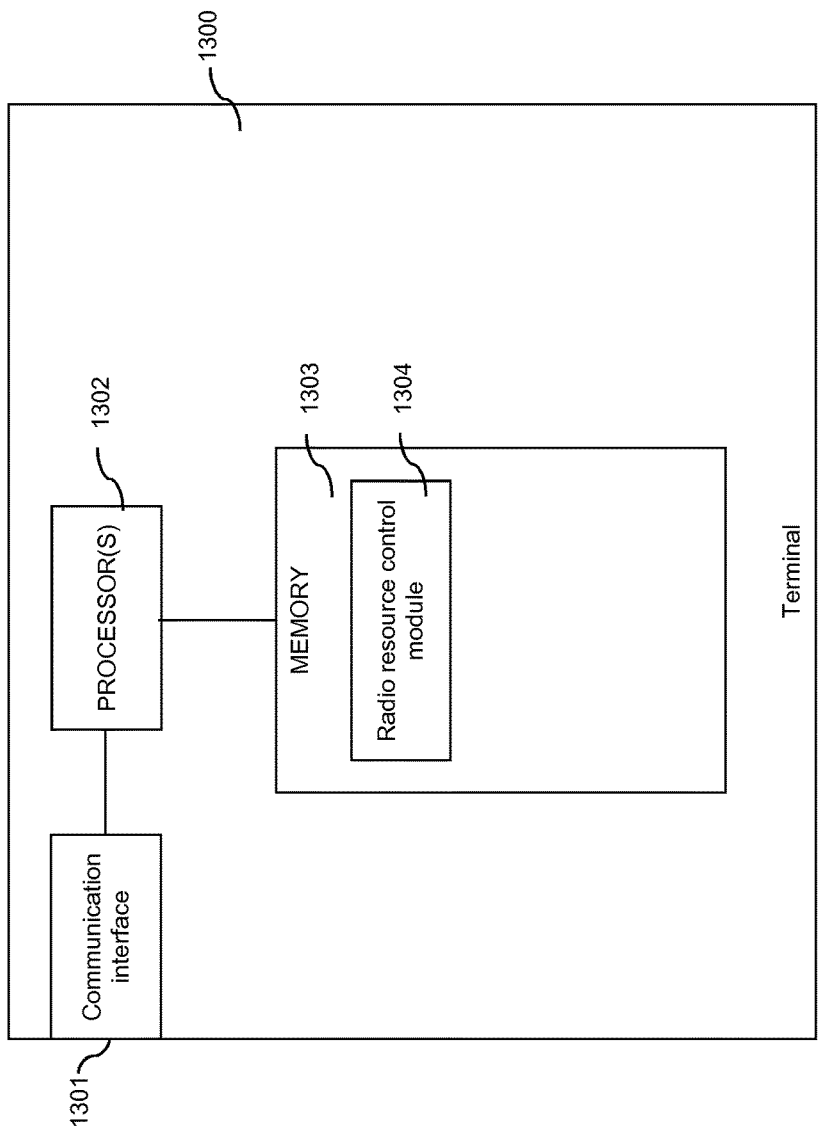
FIG. 13 shows a block diagram of a terminal.

The inventive concept can also be embodied in the form of a terminal, such as terminal 702. FIG. 13 shows a schematic block diagram in which a terminal 1300 has a communication interface 1301 for communication with one or more network entities, one or more processors 1302 for executing control operations, and a memory system 1303 arranged to comprise both control instructions (e.g. in the form of software code parts) forming a radio resource control module 1304. The terminal 1300 comprises a radio resource controller (e.g. the code parts of module 1304 when loaded for execution into processor 1302) arranged for performing a radio resource control resume process that comprises determining whether the connected state is to be resumed according to the stored radio resource configuration information or if different radio resource configuration information is to be used for resuming the connected state.

The above described concepts allow a better handling of network resources, both radio resources and network resources, because it allows the concerned nodes (e.g. in RAN and/or the CN) to flexibly choose whether the full bearer context previously stored for a terminal is re-activated at terminal resume or if a reduced bearer context is established once the terminal resumes. This solves problems of unwanted bearer dropping or poor QoS because bearers that do not need to be admitted would be dropped before the resume procedure is completed, while bearers that cannot be admitted with the QoS levels stored in the bearer context will be subject to a QoS negotiation, e.g. between RAN and CN, where QoS will be modified in a way that the bearer can still be successfully admitted.

According to a further embodiment, the RAN should be able to assess whether all bearers previously suspended can be resumed, and if resources are not available, the RAN should have the means to indicate to the CN which bearers failed to be established. It is important to notice that preventing the RAN from running admission control at the time of UE Context Resume would imply that all the E-RABs previously suspended will have to be resumed. In a situation where resources are not sufficient to admit all the E-RABs an unconditional full admission may impact the QoS of all active bearers because the already scarce resources would have to be shared with more bearers that cannot be admitted. This would have negative impacts on end user's quality of experience.

It is thus pointed out that it is advantageous that the RAN be able to run admission control on bearers to be resumed and to indicate which bearers failed to be resumed.

Equivalently, in legacy systems, the CN is able to indicate whether some bearers should be released. This is possible in a number of E-RAB management procedures such as the S1: E-RAB Release Command. It may be pointed out that at S1 E-RAB Setup Request the CN has the freedom to set up E-RABs for which CN resources are available. Therefore, the CN can, at E-RAB Setup, run an implicit admission control.

In the case of UE Context Resume the scenario is equivalent, namely the CN should be able to detect whether some E-RABs cannot be admitted and it should be able to indicate it to the RAN. Failure to do so would imply admitting E-RABs for which resources are not available with potential impacts on all active bearers' QoS, as explained already above.

It is thus pointed out that it is advantageous that the CN be able to run admission control on bearers to be resumed and to indicate which bearers failed to be resumed.

Thus, the present invention proposes to introduce a system behavior that enables the RAN and the CN to determine which of the bearers associated with a UE context that has been suspended can be resumed. With such behavior, RAN and CN would be able to only resume bearers for which resources can be admitted at UE context resume.

Following a behavior already used in the E-RAB management procedures over the S1 interface, the RAN and the CN can run admission control on bearers to be resumed and can signal to each other which bearers have been successfully resumed and which have failed to be resumed.

Figure 18:
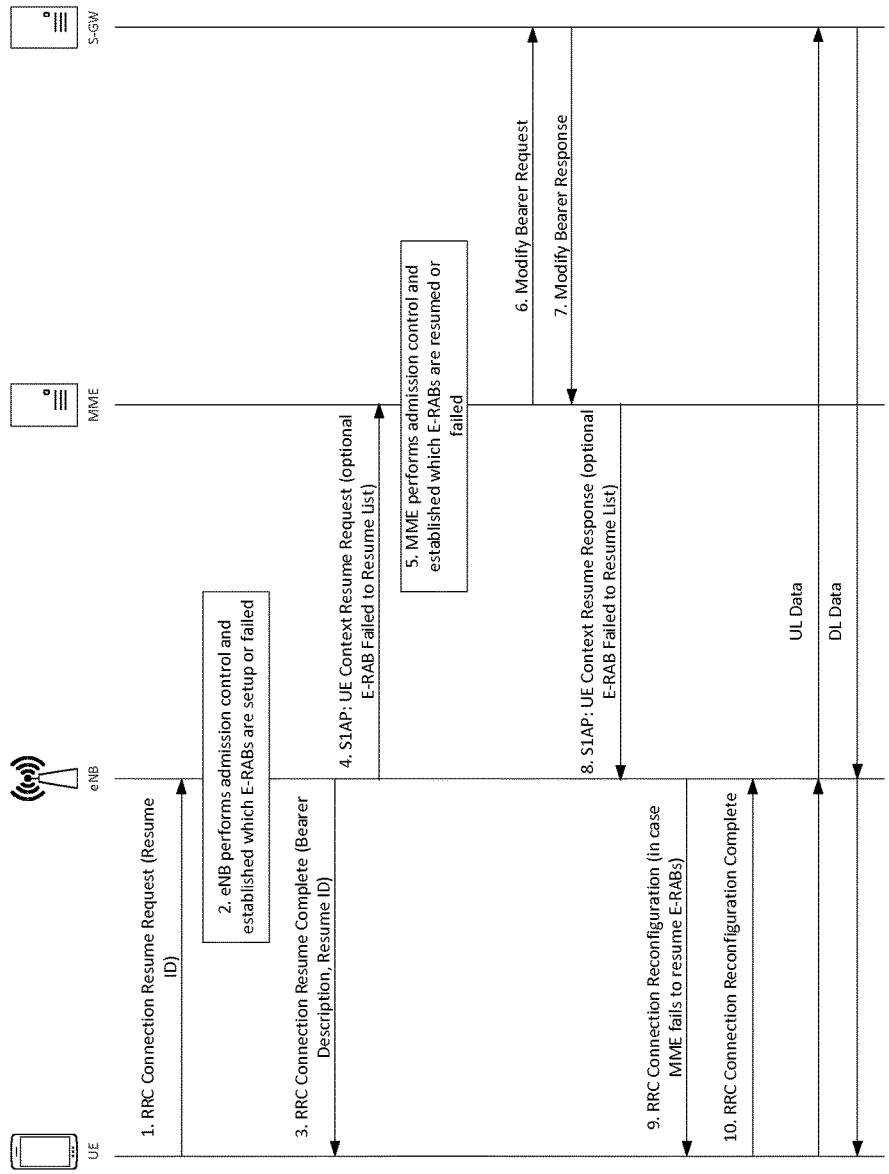
FIG. 18 schematically gives an overview of a radio resource control method according to another embodiment.

FIG. 18 shows an example of how the UE Context Resume procedure can be specified in order to allow for admission control of bearers to be resumed.

In Step 1 the serving RAN receives an indication of connection resume triggered by a UE or triggered by the CN, where the UE was previously sent to Idle and for which the UE context was suspended.

In Step 2 the RAN, upon retrieving the UE bearer context, may determine that the UE bearers cannot be admitted, for example due to RAN load conditions. The RAN would therefore determine which bearers can be admitted and which bearers should not be resumed In Step 3 the RAN indicates to the UE which DRBs are resumed In Step 4 the RAN sends the UE Context Resume Request to the MME specifying that the UE radio resources need to be re-established. In the same message the RAN can list the bearers that failed to be resumed as a consequence of admission control.

In Step 5 the MME performs a check on whether the bearers the RAN intends to resume can be admitted. If the MME is not able to resume some of the bearers it will indicate this to the RAN in Step 8 with a list of bearers that failed to be resumed.

In Step 6 and 7 the MME indicates to the S-GW the accepted EPS bearers and the S-GW replies to it.

In Step 8 the MME replies to the eNB with an UE Context Resume Response message where it can list bearers that failed to be resumed. If a list of bearers that failed to be resumed is present in Step 8 the eNB may reconfigure the UE via legacy procedures in Step 9 and Step 10.

With this mechanism it is possible to ensure that the bearers to be resumed are only those bearers for which resources can be admitted from both RAN and CN. This greatly improves resource management and user's quality of experience during UE Context Resume procedures.

The present invention therefore proposes to perform admission control for bearers resumed at UE Idle to Active transitions after UE context suspension and to the providing of an indication of bearers that cannot be resumed from eNB to MME and vice versa.

The invention claimed is:

1. A method of radio resource control in a communication network entity designed for supporting a communication between a terminal and a communication network that comprises said communication network entity, said communication between said communication network and said terminal being carried over one or more radio resources,
   said terminal and said communication network being arranged to support a radio resource control suspend operation in which each of said terminal and said communication network stores respective radio resource control information related to a configured connected state of said terminal, said radio resource control information comprising radio resource configuration information belonging to a set of radio resources associated with said configured connected state;
   said terminal and said communication network furthermore being arranged to support a radio resource control resume operation in which each of said terminal and said communication network refers to the respectively stored radio resource control information for resuming an connected state of said terminal;
   said method comprising:
      performing an admission control process during said radio resource control resume operation, said admission control process comprising a procedure for examining whether said connected state is to be resumed according to the stored radio resource configuration information or if a radio resource reconfiguration procedure is to be performed for resuming the connected state.

2. The method of claim 1, wherein said radio resource reconfiguration procedure comprises a procedure for examining which radio resources among said set of radio resources associated with said configured connected state are to be admitted according to the stored radio resource configuration information.

3. The method of claim 1, wherein said radio resource reconfiguration procedure comprises a procedure for examining which radio resources among said set of radio resources associated with said configured connected state may be admitted after modification compared to the stored radio resource configuration information.

4. The method of claim 3, wherein said modification relates to quality of service parameters.

5. The method of claim 1, wherein said radio resource reconfiguration procedure comprises a procedure for examining which radio resources among said set of radio resources associated with said configured connected state may not be admitted.

6. The method of claim 1, wherein said radio resource reconfiguration procedure comprises a procedure for examining whether new radio resources different from said set of radio resources associated with said configured connected state may be added when resuming the connected state.

7. The method of claim 1, wherein said admission control process comprises a decision procedure for deciding whether the connected state is to be resumed using only radio resources dedicated to communicating signaling or the connected state is to be resumed using both radio resources dedicated to communicating signaling and radio resources dedicated to communicating data.

8. The method of claim 7, wherein said decision procedure comprises a procedure for checking a dedicated flag in a received message for triggering said radio resource control resume operation.

9. The method of claim 1, wherein said communication network comprises an access network and a communication control network, and said communication network entity comprises an access network entity.

10. The method of claim 9, wherein said radio resource reconfiguration procedure comprises a procedure for referring to a reconfiguration framework record whose contents are set dependent on information received from said communication control network.

11. The method of claim 9, wherein said admission control process comprises a process for:
   sending a radio resource proposal message to said communication control network;
   receiving from said communication control network a response message related to said radio resource proposal message; and
   subsequently operating the resumed connected state in dependence on the content of said response message.

12. The method of claim 11, wherein said radio resource proposal message comprises one of:
   a radio resource confirmation message confirming the radio resource configuration information comprised in the radio resource control information stored during the radio resource control suspend operation; and
   a radio resource reconfiguration message comprising radio resource reconfiguration information for operating the resumed connected state with radio resources reconfigured with respect to the resource control information stored during the radio resource control suspend operations.

13. The method of claim 12, wherein said response message comprises one of:
   an acknowledgment message confirming operating the resumed connected state according to the radio resource proposal message; and
   a new radio resource reconfiguration message comprising radio resource configuration information modified with respect to the radio resource proposal message sent to said communication control network.

14. The method of claim 11, wherein said admission control process comprises a process for:
   sending a first radio resource proposal message to said communication control network at a first time; and
   if subsequent to said first time it is determined that a radio resource proposal revision condition is given, sending a second radio resource proposal message associated with different radio resource configuration information than said first radio resource proposal message to said communication control system.

15. The method of claim 14, wherein the process of determining whether a radio resource proposal revision condition is given is only performed within a predetermined time window after the first time.

16. The method of claim 9, wherein if the connected state is to be resumed with a set of radio resources configured differently than determined by the radio resource control information stored during the radio resource control suspend operation, then sending to said terminal a radio resource control communication reconfiguration message comprising radio resource reconfiguration information belonging to a set of reconfigured radio resources.

17. The method of claim 1, wherein said communication network comprises an access network and a communication control network, and said communication network entity comprises a communication control network entity.

18. The method of claim 17, wherein said admission control process comprises a process for:
receiving a radio resource proposal message from said access network;
sending to said access network a response message related to said radio resource proposal message; and
subsequently operating the resumed connected state in dependence on the content of said response message.

19. The method of claim 18, wherein said radio resource proposal message comprises one of:
a radio resource confirmation message confirming the radio resource configuration information comprised in the radio resource control information stored during the radio resource control suspend operation; and
a radio resource reconfiguration message comprising radio resource reconfiguration information for operating the resumed connected state with radio resources reconfigured with respect to the resource control information stored during the radio resource control suspend operations.

20. The method of claim 19, wherein said response message comprises one of:
an acknowledgment message confirming operating the resumed connected state according to the radio resource proposal message; and
a new radio resource reconfiguration message comprising radio resource configuration information modified with respect to the radio resource proposal message sent to said communication control network entity.

21. The method of claim 18, wherein said admission control process comprises a process for:
receiving a first radio resource proposal message from said access network at a first time; and
subsequently performing a monitoring procedure for determining whether a second radio resource proposal message is received that is associated with different radio resource configuration information than said first radio resource proposal message sent to said communication control network entity.

22. The method of claim 21, wherein the monitoring procedure is only performed within a predetermined time window after the first time.

23. The method of claim 1, wherein said admission control process is arranged such that signaling connections as identified in said radio resource control information stored during the radio resource control suspend operation are left unchanged even if a radio resource reconfiguration procedure is to be performed for resuming the connected state.

24. A non-transitory readable medium storing a computer program product for controlling a communication network entity designed for supporting a communication between a terminal and a communication network that comprises said communication network entity, said communication between said communication network and said terminal being carried over one or more radio resources,
said terminal and said communication network being arranged to support a radio resource control suspend operation in which each of said terminal and said communication network stores respective radio resource control information related to a configured connected state of said terminal, said radio resource control information comprising radio resource configuration information belonging to a set of radio resources associated with said configured connected state;
said terminal and said communication network furthermore being arranged to support a radio resource control resume operation in which each of said terminal and said communication network refers to the respectively stored radio resource control information for resuming an connected state of said terminal;
said computer program product comprising computer software instructions which, when executed on a processing system of a communication network entity, perform an admission control process during said radio resource control resume operation, said admission control process comprising a procedure for examining whether said connected state is to be resumed according to the stored radio resource configuration information or if a radio resource reconfiguration procedure is to be performed for resuming the connected state.

25. A communication network entity designed for supporting a communication between a terminal and a communication network that comprises said communication network entity, said communication between said communication network and said terminal being carried over one or more radio resources,
said terminal and said communication network being arranged to support a radio resource control suspend operation in which each of said terminal and said communication network stores respective radio resource control information related to a configured connected state of said terminal, said radio resource control information comprising radio resource configuration information belonging to a set of radio resources associated with said configured connected state;
said terminal and said communication network furthermore being arranged to support a radio resource control resume operation in which each of said terminal and said communication network refers to the respectively stored radio resource control information for resuming an connected state of said terminal;
said communication network entity comprising a radio resource controller configured to perform an admission control process during said radio resource control resume operation, said admission control process comprising a procedure for examining whether said connected state is to be resumed according to the stored radio resource configuration information or if a radio resource reconfiguration procedure is to be performed for resuming the connected state.

26. The communication network entity of claim 25, wherein the communication network entity comprises an eNodeB.

27. The communication network entity of claim 26, wherein the communication network is the eNodeB.

28. The communication network entity of claim 25, wherein the communication network entity comprises a Mobility Management Entity.

29. The communication network entity of claim 28, wherein the communication network entity is the Mobility Management Entity.

30. A method of radio resource control in a terminal designed for supporting a communication between said terminal and a communication network, said communication between said communication network and said terminal being carried over one or more radio resources,
- said terminal and said communication network being arranged to support a radio resource control suspend operation in which each of said terminal and said communication network stores respective radio resource control information related to a configured connected state of said terminal, said radio resource control information comprising radio resource configuration information belonging to a set of radio resources associated with said configured connected state;
- said terminal and said communication network furthermore being arranged to support a radio resource control resume operation in which each of said terminal and said communication network refers to the respectively stored radio resource control information for resuming an connected state of said terminal;
- said method comprising:
  - performing a radio resource control resume process that comprises determining whether said connected state is to be resumed according to the stored radio resource configuration information or if different radio resource configuration information is to be used for resuming the connected state.

31. The method of claim 30, wherein said radio resource configuration information different from said stored radio resource configuration information is received from said communication network.

32. A non-transitory computer readable medium storing a computer program product for controlling a terminal designed for supporting a communication between said terminal and a communication network, said communication between said communication network and said terminal being carried over one or more radio resources,
- said terminal and said communication network being arranged to support a radio resource control suspend operation in which each of said terminal and said communication network stores respective radio resource control information related to a configured connected state of said terminal, said radio resource control information comprising radio resource configuration information belonging to a set of radio resources associated with said configured connected state;
- said terminal and said communication network furthermore being arranged to support a radio resource control resume operation in which each of said terminal and said communication network refers to the respectively stored radio resource control information for resuming an connected state of said terminal;
- the computer program product comprising software instructions which, when executed on a processing system of the terminal, causes the terminal to perform a radio resource control resume process that comprises determining whether said connected state is to be resumed according to the stored radio resource configuration information or if different radio resource configuration information is to be used for resuming the connected state.

33. A terminal designed for supporting a communication between said terminal and a communication network, said communication between said communication network and said terminal being carried over one or more radio resources,
- said terminal and said communication network being arranged to support a radio resource control suspend operation in which each of said terminal and said communication network stores respective radio resource control information related to a configured connected state of said terminal, said radio resource control information comprising radio resource configuration information belonging to a set of radio resources associated with said configured connected state;
- said terminal and said communication network furthermore being arranged to support a radio resource control resume operation in which each of said terminal and said communication network refers to the respectively stored radio resource control information for resuming an connected state of said terminal;
- said terminal comprising a radio resource controller arranged for performing a radio resource control resume process that comprises determining whether said connected state is to be resumed according to the stored radio resource configuration information or if different radio resource configuration information is to be used for resuming the connected state.

34. The terminal entity of claim 33, wherein the terminal entity comprises a User Equipment.

* * * * *

UNITED STATES PATENT AND TRADEMARK OFFICE
CERTIFICATE OF CORRECTION

PATENT NO. : 10,057,904 B2
APPLICATION NO. : 15/554840
DATED : August 21, 2018
INVENTOR(S) : Centonza et al.

Page 1 of 2

It is certified that error appears in the above-identified patent and that said Letters Patent is hereby corrected as shown below:

On the Title Page

In Item (54), in Title, in Column 1, Line 2, delete "IN CELLULAR" and insert -- IN A CELLULAR --, therefor.

In the Drawings

In Fig. 4, Sheet 4 of 18, delete "Initital" and insert -- Initial --, therefor.

In Fig. 6, Sheet 6 of 18, delete "(EAB" and insert -- (EAB) --, therefor.

In Fig. 14, Sheet 14 of 18, for Step "1402", in Line 2, delete "„Resume ID"" and insert -- "Resume ID" --, therefor.

In the Specification

In Column 1, in Title, Line 2, delete "IN CELLULAR" and insert -- IN A CELLULAR --, therefor.

In Column 1, Line 56, delete "an connected" and insert -- a connected --, therefor.

In Columns 1 & 2, Lines 65-67 & 1-4, delete "performing an admission......state." and insert the same at Column 1, Line 64, after "comprises" as a continuation paragraph.

In Column 2, Lines 26-30, delete "performing a radio..........connected state." and insert the same at Line 25, after "comprises" as a continuation paragraph.

In Column 6, Line 2, delete "K eNB" and insert -- K_eNB --, therefor.

In Column 6, Line 25, delete "SLAP" and insert -- S1AP --, therefor.

Signed and Sealed this
Thirtieth Day of July, 2019

Andrei Iancu
*Director of the United States Patent and Trademark Office*

CERTIFICATE OF CORRECTION (continued)
U.S. Pat. No. 10,057,904 B2

In Column 6, Line 44, delete "SLAP" and insert -- S1AP --, therefor.

In Column 7, Line 32, delete "UE,)." and insert -- UE). --, therefor.

In Column 10, Line 29, delete "budget." and insert -- budget; --, therefor.

In Column 11, Line 50, delete "RRC IDLE" and insert -- RRC_IDLE --, therefor.

In Column 11, Line 58, delete "wo FIG. 10." and insert -- to FIG. 10. --, therefor.

In Column 20, Line 51, delete "resumed" and insert -- resumed. --, therefor.

In Column 20, Line 53, delete "resumed" and insert -- resumed. --, therefor.

In Column 20, Line 64, delete "Step 6 and 7" and insert -- Steps 6 and 7 --, therefor.

In the Claims

In Column 21, Line 36, in Claim 1, delete "an connected" and insert -- a connected --, therefor.

In Column 24, Line 18, in Claim 24, delete "an connected" and insert -- a connected --, therefor.

In Column 24, Line 50, in Claim 25, delete "an connected" and insert -- a connected --, therefor.

In Column 25, Line 23, in Claim 30, delete "an connected" and insert -- a connected --, therefor.

In Column 26, Line 8, in Claim 32, delete "an connected" and insert -- a connected --, therefor.

In Column 26, Line 37, in Claim 33, delete "an connected" and insert -- a connected --, therefor.